United States Patent
Dan et al.

(10) Patent No.: US 10,223,481 B2
(45) Date of Patent: Mar. 5, 2019

(54) COMPUTER-AIDED RESIN BEHAVIOR ANALYZER

(71) Applicant: Honda Motor Co., Ltd., Tokyo (JP)

(72) Inventors: Koji Dan, Wako (JP); Masatoshi Kobayashi, Wako (JP); Tsuyoshi Baba, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 314 days.

(21) Appl. No.: 15/096,168

(22) Filed: Apr. 11, 2016

(65) Prior Publication Data

US 2016/0342716 A1 Nov. 24, 2016

(30) Foreign Application Priority Data

Apr. 15, 2015 (JP) .................................. 2015-082183
Jul. 3, 2015 (JP) .................................. 2015-134616

(51) Int. Cl.
G06F 17/50 (2006.01)

(52) U.S. Cl.
CPC ...... G06F 17/5009 (2013.01); G06F 17/5018 (2013.01); G06F 2217/44 (2013.01)

(58) Field of Classification Search
CPC ............. G06F 17/5009; G06F 17/5018; G06F 2217/44
USPC .......................................................... 703/7
See application file for complete search history.

(56) References Cited

U.S. PATENT DOCUMENTS

| 7,797,075 B1 * | 9/2010 | Zhang ................... B29C 70/443 264/40.1 |
| 8,871,127 B2 | 10/2014 | Takahashi |
| 2009/0326140 A1 * | 12/2009 | Shimada ............... B82Y 30/00 524/495 |
| 2010/0169062 A1 * | 7/2010 | Linn .................... B29C 45/7693 703/2 |
| 2011/0178786 A1 * | 7/2011 | Fertig ................. G06F 17/5018 703/2 |

(Continued)

FOREIGN PATENT DOCUMENTS

| JP | 2013022852 A | 2/2013 |
| JP | 5418684 B2 | 2/2014 |
| JP | 2014108612 A | 6/2014 |

OTHER PUBLICATIONS

Qing-Quin Ni, Ehchi Jinen, "Fracture Behavior and Acoustic Emission in Bending Teste on Single Fiber Composites" Engineering Fracture Mechanics vol. 56, No. 6, (1997) pp. 779-796.*

*Primary Examiner* — Dwin M Craig
(74) *Attorney, Agent, or Firm* — Duft & Bornsen, PC

(57) ABSTRACT

In a computer-aided resin behavior analyzer that analyze behavior of a continuous fiber and long discontinuous fiber incorporated in a resin during molding in a mold under predetermined molding conditions through a simulation program installed on a computer, the simulation program is configured to calculate, when analysis conditions including at least multiple nodes F of the fiber is inputted, a bending rate Af of the fiber with respect to an evaluated length obtained from at least one node Fn among multiple nodes F anticipated under the molding conditions based on the analysis conditions, and to evaluate bending of the fiber based on the bending rate Af with respect to the evaluated length.

23 Claims, 23 Drawing Sheets

(56) References Cited

U.S. PATENT DOCUMENTS

2012/0330627 A1* 12/2012 Tseng ................ B29C 45/7693
　　　　　　　　　　　　　　　　　　　703/2

* cited by examiner

FIG. 17

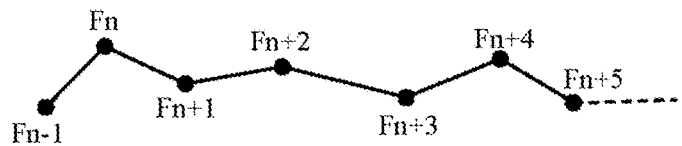

FIG. 18

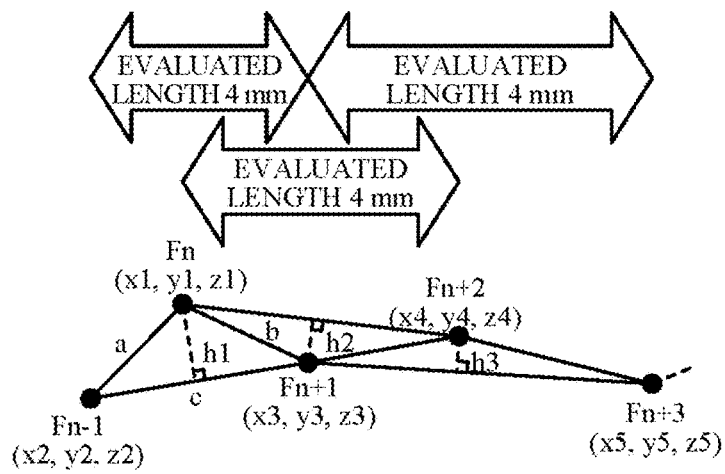

OBTAIN SIDE LENGTHS OF TRIANGLE CONSTITUTED BY Fn, Fn-1, Fn+1 (DISTANCE L BETWEEN POINT (x1, y1, z1) AND POINT (x2, y2, z2)

$$L = \sqrt{(x1 - x2)^2 + (y1 - y2)^2 + (z1 - z2)^2}$$

OBTAIN LENGTH h OF PERPENDICULAR DIRECTED FROM Fn TOWARD Fn-1Fn+1

$$h = \sqrt{a^2 - \left(\frac{a^2 - b^2 + c^2}{2c}\right)^2}$$

OBTAIN ASPECT RATIO As1 INDICATING MAGNITUDE OF BENDING (h1) WITH RESPECT TO EVALUATED LENGTH (LATERAL SIDES a+b) OF FIBER UNDULATION $$\text{BENDING ASPECT RATIO} \quad As1 = \frac{h1}{a+b}$$

US 10,223,481 B2

COMPUTER-AIDED RESIN BEHAVIOR ANALYZER

CROSS-REFERENCE TO RELATED APPLICATION

This application is based upon and claims the benefit of priority from Japanese Patent Applications No. 2015-082183 filed on Apr. 14, 2015 and No. 2015-134616 filed on Jul. 3, 2015, the contents of which are incorporated herein by reference.

BACKGROUND OF THE INVENTION

Field of the Invention

This invention relates to a computer-aided resin behavior analyzer, particularly to a computer-aided resin behavior analyzer (for computer-aided engineering) that uses a simulation program installed on a computer to analyze behavior of a resin incorporating continuous fiber and discontinuous fiber during molding in a mold.

Description of the Related Art

The technical concept set out in Japanese Unexamined Patent Publication No. 2014-108612A can be cited as an example of this type of computer-aided resin behavior analyzer that performs analysis through the medium of a simulation program installed on a computer.

The technique described in the aforesaid document analyzes the behavior of a CFRP (Carbon Fiber Reinforced Plastic) material in the course of molding based on: shape desired to be given to the CFRP material during press molding, data on physical properties and the like of the CFRP at hardness near 50% during temperature rise, and analysis conditions including force, and shift thereof, applied when the CFRP material is being molded.

SUMMARY OF THE INVENTION

In this connection, when a resin incorporating continuous fiber or long discontinuous fiber is molded by press molding or similar, product strength is usually lowered by occurrence of fiber bending (undulation) due to resin flow, so that when analyzing resin behavior by means of a simulation program, fiber bending is preferably evaluated in order to discover conditions for minimizing bending.

However, since the size of individual fibers contained in a resin is very small, fiber bending cannot be discerned without enlarged display of the analytical model, and even if the display is enlarged, fiber bending can still be evaluated only by intuition or sense. Moreover, although fiber bending occurs in various modes ranging from fine undulation (small bending) to large bending, no technique has been available for classifying or quantitatively evaluating them.

So owing to the impossibility of quantitatively assessing fiber bending, it has been impossible to accurately ascertain the causal relationship between molding conditions and fiber bending and because of this impossible to appropriately judge presence/absence of fiber bending even in the course of varying the molding conditions in order to increase strength.

Therefore, the object of this invention is to overcome the aforesaid problems by providing a computer-aided resin behavior analyzer that enables quantitative evaluation of fiber bending when behavior of a fiber reinforced resin incorporating continuous fiber and long discontinuous fiber is analyzed, by means of a simulation program installed in a computer, in the course of molding the resin in a mold under predetermined molding conditions.

In order to achieve the object, this invention is configured to have a computer-aided resin behavior analyzer that analyze bending behavior of a continuous fiber and long discontinuous fiber incorporated in a resin during molding in a mold under predetermined molding conditions through a simulation program installed on a computer, wherein the simulation program comprises the steps of: calculating, when analysis conditions including at least multiple nodes F of the fiber is inputted, a bending rate Af of the fiber with respect to an evaluated length obtained from at least one node Fn among the multiple nodes F anticipated under the molding conditions based on the inputted analysis conditions, and evaluating bending of the fiber based on the calculated bending rate Af with respect to the evaluated length.

In the computer-aided resin behavior analyzer according to this invention, the simulation program that analyze bending behavior of a fiber incorporated in a resin incorporating fiber during molding in a mold under predetermined molding conditions comprises the steps of: calculating, when analysis conditions including at least multiple nodes F of the fiber is inputted, a bending rate Af of the fiber with respect to an evaluated length obtained from at least one node Fn among multiple nodes F anticipated under the molding conditions based on the inputted analysis conditions, and evaluating bending of the fiber based on the calculated bending rate Af with respect to the evaluated length. With this, by calculating bending of the fiber incorporated in the resin as a numerical value, namely, bending rate Af with respect to the evaluated length of the fiber, it becomes possible to evaluate bending of the fiber quantitatively when analyzing behavior of the fiber-incorporating resin during molding in the cavity under predetermined molding conditions.

Moreover, it becomes possible to evaluate bending differing in mode quantitatively by evaluating bending of the fiber based on the bending rate Af with respect to the evaluated length and evaluating bending of fine undulation (small bending) at small evaluated length and of large bending at large evaluation length. Also, it becomes possible to evaluate bending of combined small-and-large bending.

In addition, by making it possible to evaluate bending of the fiber appropriately, it becomes possible to discover conditions for minimizing bending of the fiber easily, and hence, it becomes possible to vary the molding conditions in order to increase strength of the product.

BRIEF DESCRIPTION OF THE DRAWINGS

The objects, features, and advantages of the present invention will become clearer from the following description of embodiments in relation to the attached drawings, in which:

FIG. 17 is an explanatory diagram for explaining the process of the flowchart of FIG. 16;

FIG. 18 is a similar explanatory diagram for explaining the process of the flowchart of FIG. 16;

FIG. 24 is an explanatory diagram showing calculation results for the four types of fiber shown in FIG. 4, obtained in the processes of FIG. 16 and the like;

DETAILED DESCRIPTION OF THE INVENTION

Embodiments for implementing the computer-aided resin behavior analyzer according to this invention are explained with reference to the attached drawings in the following.

(First Embodiment)

Figure 1:
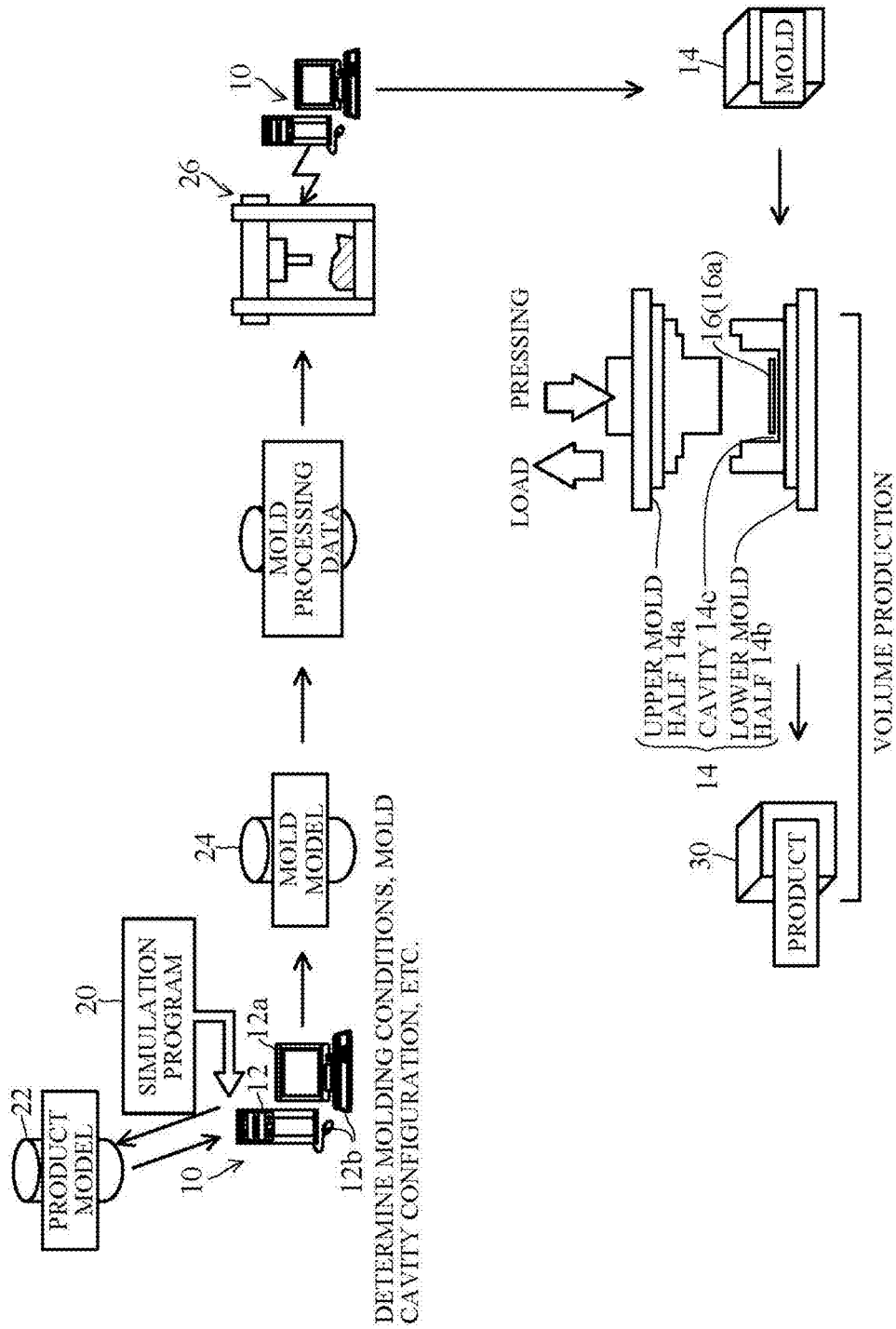
FIG. 1 is an explanatory diagram showing steps from product design to volume production implemented using a computer-aided resin behavior analyzer according to a first embodiment of this invention.

FIG. 1 is an explanatory diagram showing steps from product design to volume production implemented using the computer-aided resin behavior analyzer according to a first embodiment of this invention.

Reference numeral 10 in FIG. 1 designates a resin behavior analyzer 10 equipped with a computer 12 and configured for Computer-Aided Engineering, namely, as a computer-aided resin behavior analyzer.

The computer 12 comprises a CPU (Central Processing Unit), memory, input-output circuit and other elements configured to mutually communicate data through a bus, and has a display 12a, and input devices 12b including, inter alia, a keyboard, mouse and touch panel.

An interactive simulation program 20 for analyzing behavior of a resin 16 in a mold 14 is loaded in the memory of the computer 12 and executed by the CPU. The results are displayed on the display 12a and the input devices 12b receive operations and directions of the designer (engineer).

Explaining the mold 14 that is subjected to analysis by the simulation program 20, as shown in FIG. 1, the mold 14 is equipped with an upper mold half 14a, a lower mold half 14b, and a cavity 14c formed in between. Resin 16 is charged into the cavity 14c. The resin 16 is sheet-like and incorporates continuous fiber and long discontinuous fiber, such as carbon fiber (hereinafter collectively termed "fiber").

Upon receiving predetermined molding conditions inputted by the designer's operation of the input devices 12b, the computer 12 analyzes the behavior of the resin 16 by means of simulation using the installed interactive simulation program 20 when resin 16 is charged into the cavity 14c to make it flow under the predetermined molding conditions to form a molding (product or semi-finished product), i.e., during press-molding.

Specifically, analysis of resin 16 behavior is performed as one aspect of the processes between product design and volume production, in which the designer (engineer) inputs data through the input devices 12b and interactively designs a product model 22 in accordance with instructions included in the simulation program 20.

When product production is performed using the mold 14, the designer first designs the product model 22 in the resin analyzer 10 during a product design step and then uses the created product model 22 to design a mold model 24 in a mold design step.

Next, the designer uses the created mold model 24 to generate mold processing data, employs these data to fabricate the mold 14 by means of an NC machine tool 26 or the like, and uses the fabricated mold 14 to shape a product (or semi-finished product) 30.

Figure 2:
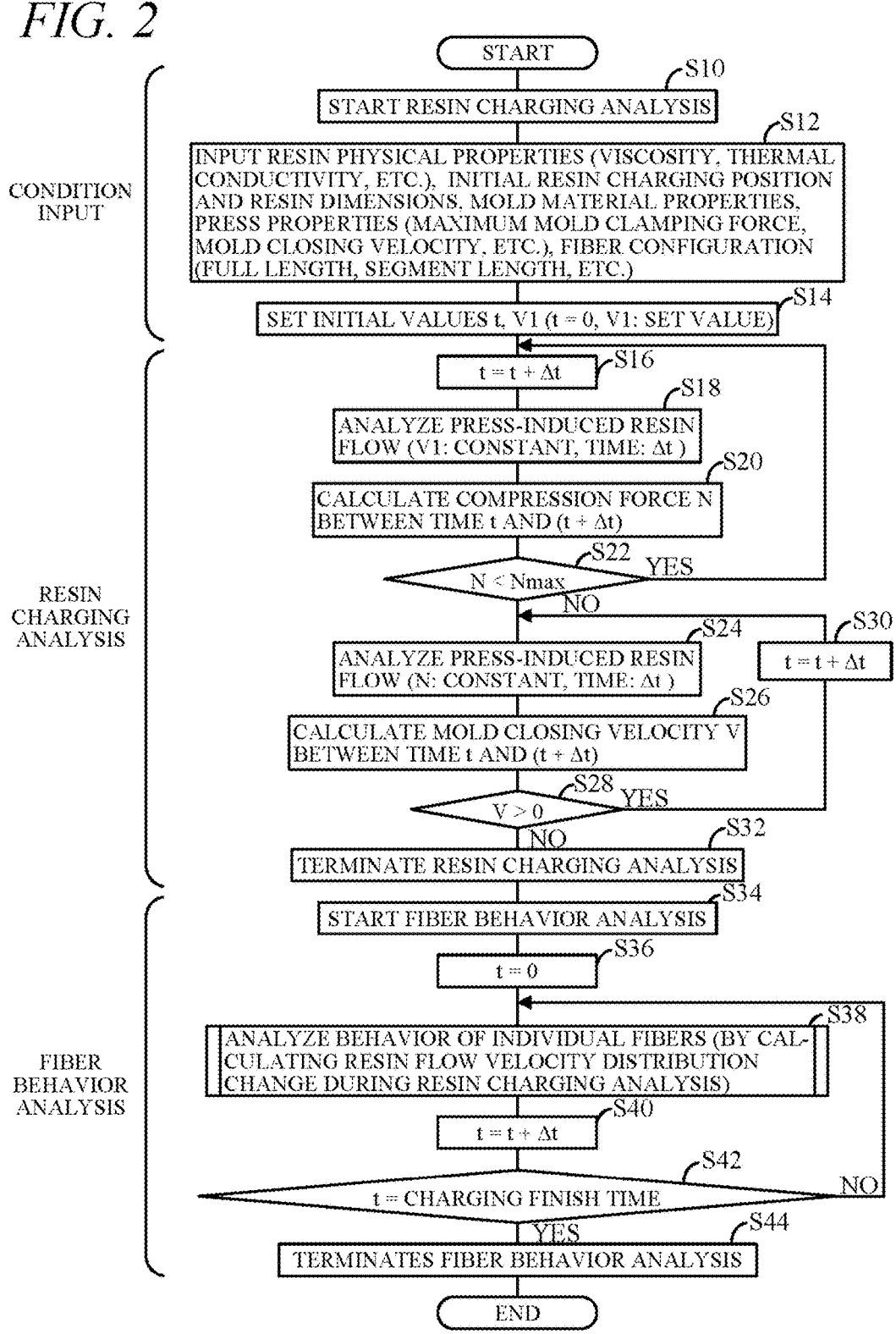
FIG. 2 is a flowchart showing processes of a simulation program installed on a computer of the analyzer shown in FIG. 1.

FIG. 2 is a flowchart showing processes (operations) performed by the resin analyzer 10 according to the first embodiment of this invention, more specifically a flowchart showing processes (steps) of the simulation program 20 installed on the computer 12 of the resin behavior analyzer 10.

Now to explain, resin charging analysis is started in S10. Specifically, the designer inputs predetermined molding conditions in S12. The predetermined molding conditions include, inter alia, physical properties (viscosity, thermal conductivity, etc.) of the (sheet-like) resin 16, initial resin charging position and dimensions of the resin 16, mold material properties, press properties (maximum mold clamping force Nmax, mold closing velocity V1, etc.), and configuration or shape and segment length of fibers 16a incorporated in the resin 16.

Next, in S14, initial values are set (reset). In other words, time t is set to 0 and mold closing velocity V to V1 of the molding conditions. The processes of S12 and S14 amount to input of conditions.

Next, in S16, time t is incremented by unit time Δt, whereafter, in S18, analysis is carried out on press-induced flow of the resin 16 during unit time Δt under constant mold closing velocity V1. Specifically, flow velocity distribution of the resin 16 in a three-dimensional space corresponding to the cavity 14c is calculated.

Next, in S20, compression force N between time t and (t+Δt) is calculated, whereafter, in S22, it is determined whether the calculated compression force N is smaller than the maximum mold clamping force Nmax. When the result in S22 is YES, the program returns to S16 and the aforesaid processes are repeated. The processes from S16 to S22 amount to charging analysis.

On the other hand, when the result in S22 is NO, since this means that the compression force N reached maximum mold clamping force Nmax, the program goes to S24, in which analysis is carried out on press-induced flow of the resin 16 during unit time Δt under constant compression force N. Specifically, flow velocity distribution of the resin 16 upon charging during unit time Δt when the compression force N is maximum is calculated.

Next, in S26, mold closing velocity V between time t and (t+Δt) is calculated, whereafter, in S28, it is determined whether the calculated mold closing velocity V is greater than 0. When the result in S28 is YES, time t is incremented by unit time Δt in S30 and the program returns to S24 to repeat the aforesaid processes.

On the other hand, when the result in S28 is NO, since this means that the mold closing velocity V became 0 and charging of the resin 16 is done, the program goes to S32 and terminates resin charging analysis. The processes from S24 to S32 also amount to charging analysis.

Next, fiber behavior analysis is started in S34.

Namely, the program goes to S36 to reset time t to 0 and then to S38 to analyze behavior of all fibers 16a, i.e., every fiber 16a individually. More specifically, three-dimensional coordinates are assigned to individual fibers 16a at time t=0 (t: charging analysis time of the resin 16), and behavior of the individual fibers 16a with flow of the resin 16 is analyzed based on the assigned coordinates and the flow velocity distribution of the resin 16 calculated in S18 and S24, namely, the behavior is analyzed by calculating the coordinates of individual nodes F of the individual fibers 16a and evaluating bending of the individual fibers 16a.

Next, time is incremented by unit time Δt in S40, whereafter, in S42, it is determined whether time t reached the charging finish time of the resin 16. When the result in S42 is NO, the program returns to S38, and when YES, goes to S44 and terminates fiber behavior analysis. The processes from S34 to S44 amount to fiber behavior analysis.

Figure 3:
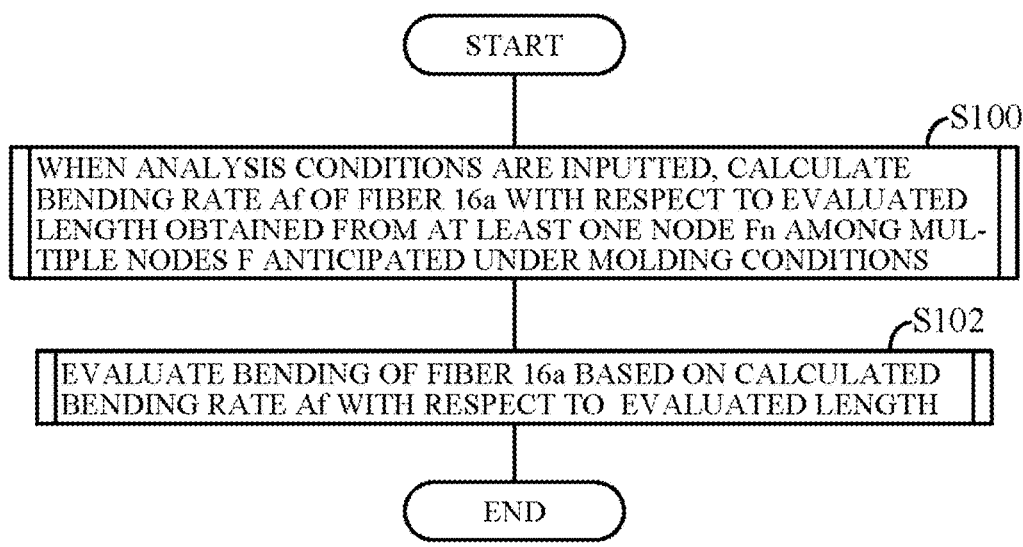
FIG. 3 is a subroutine flowchart of processes in S38 of the flowchart of FIG. 2.

FIG. 3 is a subroutine flowchart of processes in S38 of the flowchart of FIG. 2. In S100, when, with focus on a single fiber among many fibers 16a incorporated in the resin 16, analysis conditions including at least multiple nodes F of the single fiber 16a are inputted by the designer through the input devices 12b, calculation is performed to determine a bending rate Af of the single fiber 16a with respect to an evaluated length obtained from at least one node Fn among the multiple nodes F anticipated under the aforesaid molding conditions. The analysis conditions include length of the fibers 16a, distance between nodes F, and shape of the product 30.

Figure 4:
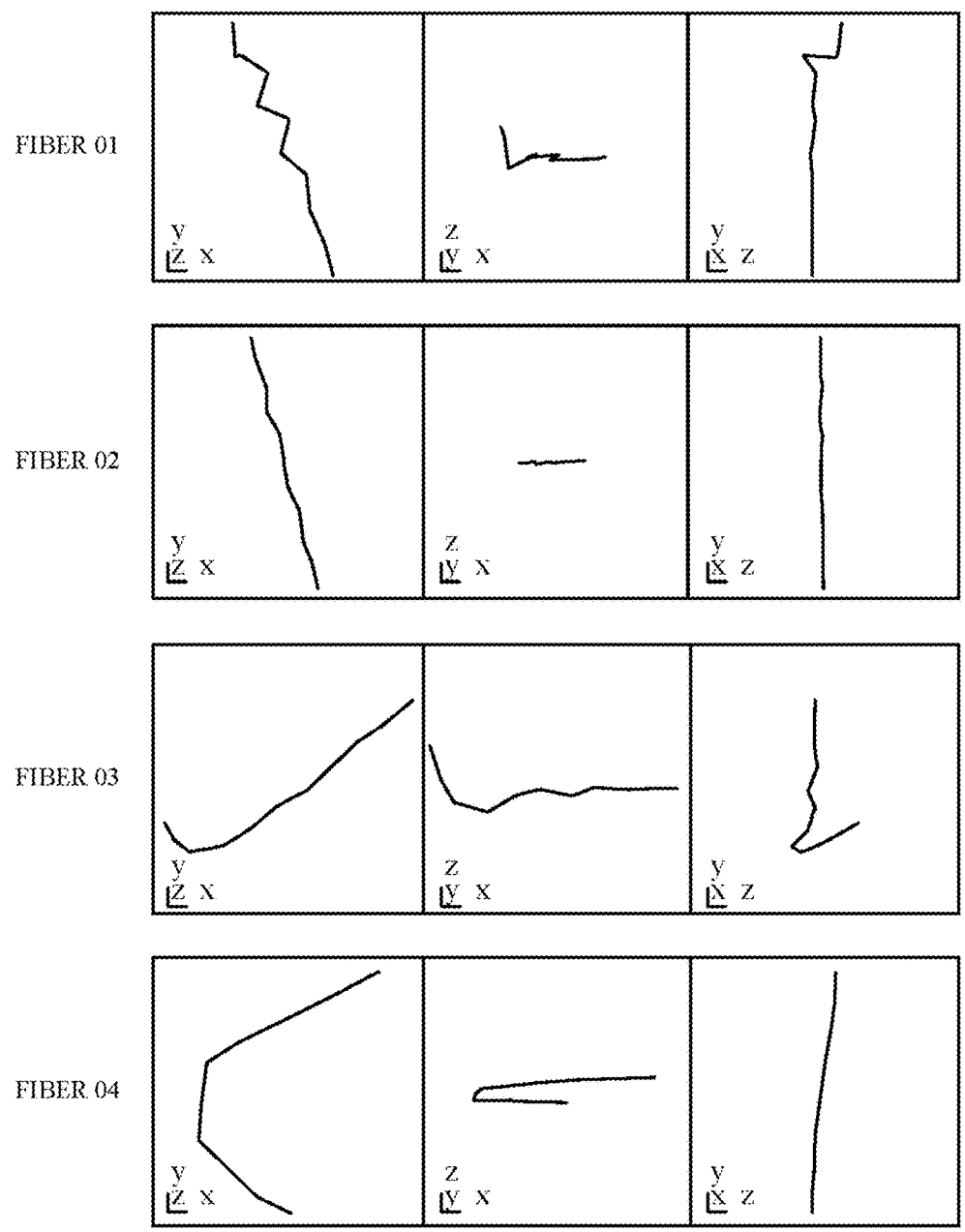
FIG. 4 is an explanatory diagram showing four examples, fibers 01 to 04, of individual fibers subject to bending evaluation of FIG. 3.

FIG. 4 is an explanatory diagram showing four examples, 01 to 04, of individual fibers 16a subject to bending evaluation. In this embodiment, each of the four example fibers 16a has 20 mm length (fiber length), 10 segments, and fixed segment length. Namely, each of the four example fibers has 11 nodes F that divide its length into 10 segments of equal length. In this embodiment, the fibers 16a are evaluated for bending one by one in all four examples.

Although the shapes (positions) of the fibers 16a must be ascertained in order to evaluate fiber 16a bending, the many fibers 16a incorporated in the resin 16 are individually assigned coordinate positions in the three-dimensional space of the cavity 14c by the simulation according to the configuration of FIG. 1 at the time the resin 16 is charged into the cavity 14c of the mold 14, and the positions of the fibers 16a are therefore specified (detected) using these coordinate positions.

Figure 5:
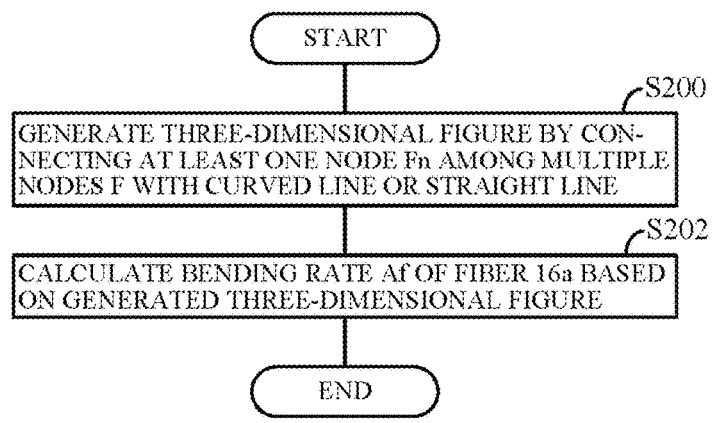
FIG. 5 is a subroutine flowchart of processes in S100 of the flowchart of FIG. 3.

FIG. 5 is a subroutine flowchart of processes in S100 of the flowchart of FIG. 3, and FIGS. 6 to 12 are explanatory diagrams for explaining the processes of the FIG. 5 flowchart.

First, in S200, a three-dimensional figure is generated by connecting at least one node Fn among multiple nodes F with a curved line or straight line. Nodes F are read from data stored in the memory of the computer 12 as coordinates of nodes F of the fiber 16a at time t prescribed in the flowchart of FIG. 2

Next, in S202, bending rate Af of the fiber 16a is calculated based on the generated three-dimensional figure.

Figure 6:
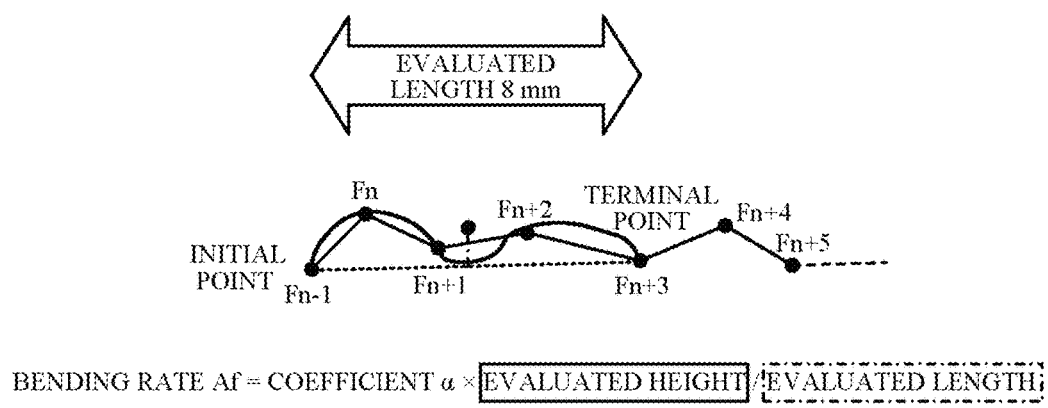
FIG. 6 is an explanatory diagram for explaining the processes of the FIG. 5 flowchart.

As shown in FIG. 6, bending rate Af is calculated based on ratio between "evaluated length" of the fiber 16a and "evaluated height" of the fiber 16a in the three-dimensional figure generated by connecting nodes Fn selected from among multiple nodes F. Further, the evaluated length is calculated as length from initial point to terminal point of the three-dimensional figure generated by connecting all or some of the selected nodes Fn with curved lines or straight lines.

The figures shown in FIG. 6 and ensuing drawings are two-dimensional figures obtained by projecting three-dimensional figures in xyz three-dimensional space on an xy plane, but for convenience of illustration, these two-dimensional figures are used to mean the "three-dimensional figures" referred to in the claims.

Figure 7:
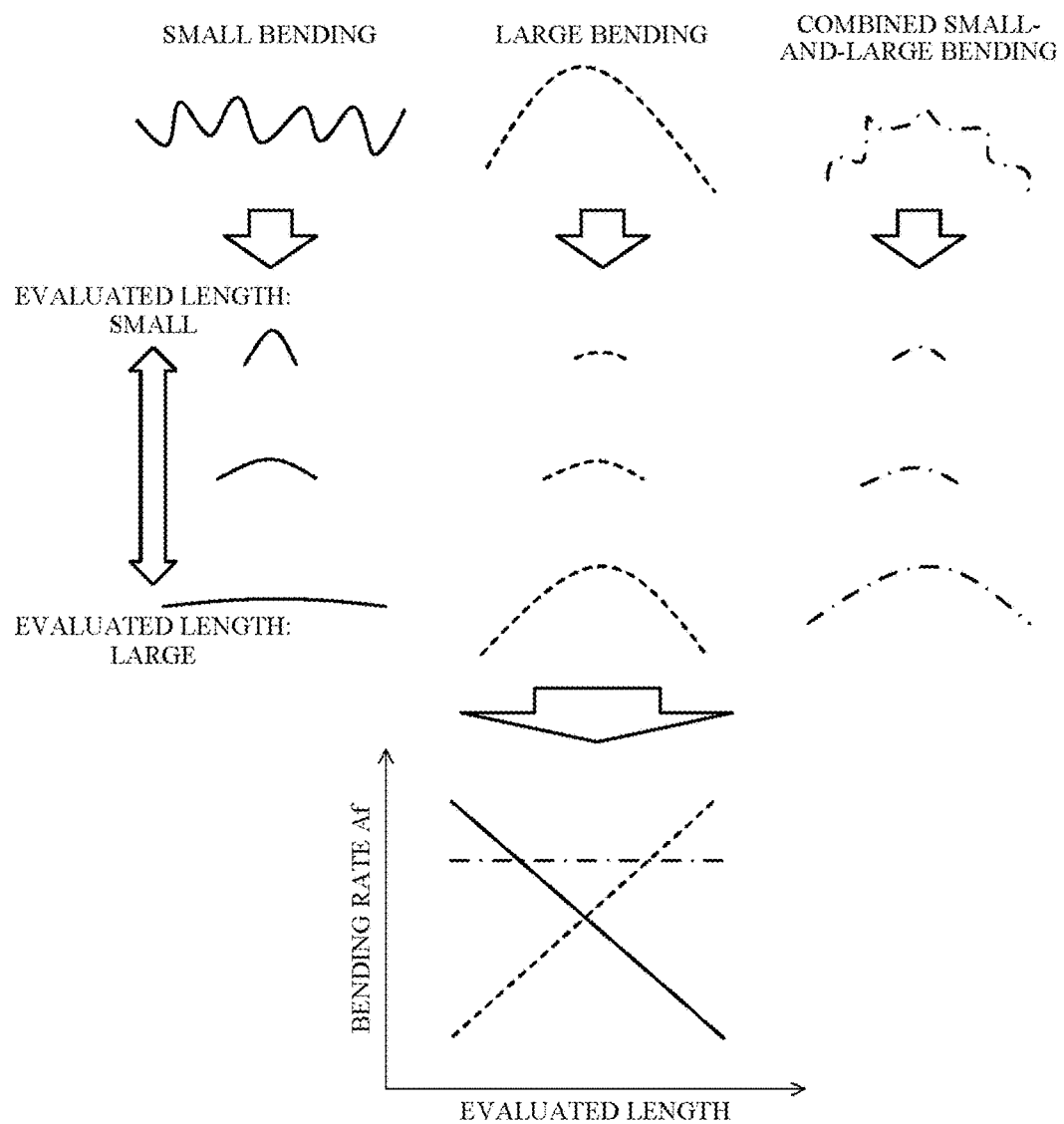
FIG. 7 is a similar explanatory diagram for explaining the processes of the FIG. 5 flowchart.

As shown in FIG. 7, fiber 16a bending mode can be broadly classified into bending with fine undulation (small bending), with large bending, and with combined small-and-large bending.

In order to quantitatively evaluate bending differing in mode in this way, each mode must be evaluated independently. It is therefore determined to evaluate bending magnitude (bending rate Af) for individual specific lengths (evaluated lengths). Namely, it is determined to calculate bending rate Af of small bending at small evaluated length and of large bending at large evaluated length.

As stated earlier, in this and later embodiments, evaluated length is defined not as straight line distance from initial point to terminal point of the three-dimensional figure but as length of fiber 16a from initial point to terminal point. This is to align the horizontal axes (evaluated lengths) of those with strong and weak bending.

Figure 8:
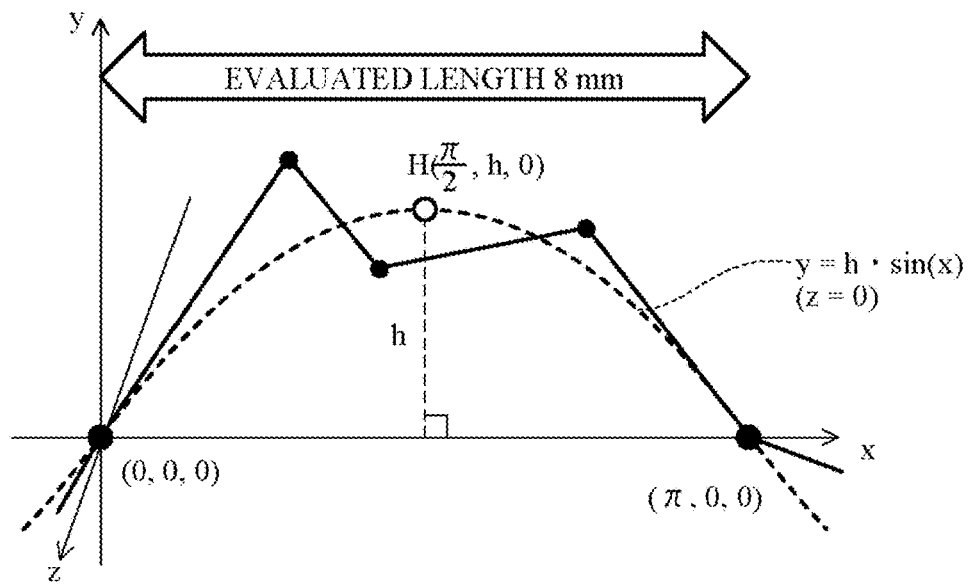
FIG. 8 is a similar explanatory diagram for explaining the processes of the FIG. 5 flowchart.

Calculation of the evaluated height of FIG. 6 will be explained next with reference to FIG. 8. Assuming the shape of fiber 16a bending to be sinusoidal, it is possible to calculate the evaluated height h as an amplitude of the sine curve.

Specifically, a point H ($\pi/2$, h, 0) would be defined in a new three-dimensional space coordinate system whose three-dimensional figure initial point is (0, 0, 0) and terminal point is ($\pi$, 0, 0), and the evaluated height h can be calculated by the least squares method to minimize the sum total of the distances between nodes Fn and curve $y=h \cdot \sin(x)(z=0)$.

However, the calculation of the evaluated height h by assuming a sine curve in this way is not practical because it involves heavy high calculation load. It is therefore determined to calculate evaluated height h based on the shape of a three-dimensional figure generated by linking nodes Fn with already established coordinates.

Figure 9:
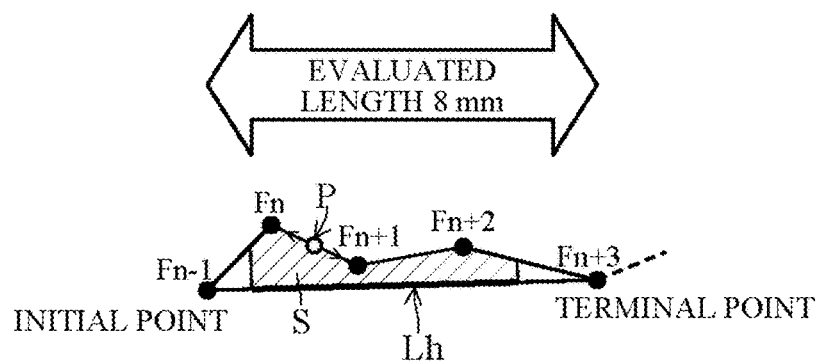
FIG. 9 is a similar explanatory diagram for explaining the processes of the FIG. 5 flowchart.

Specifically, it is determined to calculate based on a shape as shown in FIG. 9. Namely, a procedure is adopted for calculating evaluated height h by connecting nodes Fn with straight lines to generate a three-dimensional figure, letting a point P move on the generated three-dimensional figure all or part of the way from the initial point to the terminal point, and dividing an area S of the part traversed by a perpendicular dropped from the point P to a straight line connecting the initial point and the terminal point by length Lh of the part traversed by the foot of the perpendicular.

More concretely, denoting the interval between two adjacent nodes as one section, point P is represented for each section by a mathematical expression as a point on a straight line passing through two adjacent nodes Fn. Next, distance between the point P and a straight line passing through the initial and terminal points is represented by a mathematical expression, this is integrated to obtain the area of the section, and the total value of all section areas is calculated.

Alternatively, nodes Fn can be connected with curved lines insofar as mathematical expression is possible. Each node F is assigned a number by reading coordinates (x, y, z three-dimensional coordinates) of the node (or one end (start end) and other end (finish end)) of the fiber 16a from data stored in the memory of the computer 12 and performing numbering. Returning to the explanation of the flowchart of FIG. 3, next, in S102, the bending of the fiber 16a is evaluated based on the calculated bending rate Af with respect to the evaluated length.

Figure 10:
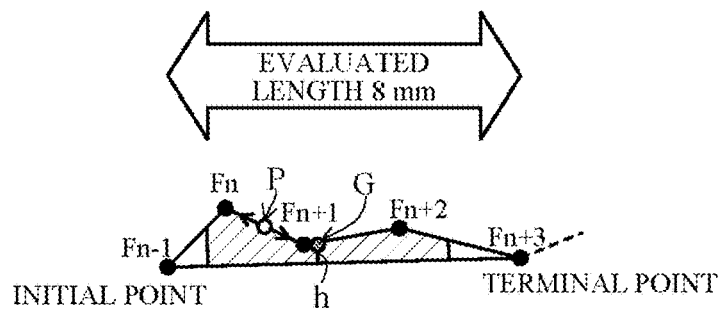
FIG. 10 is a similar explanatory diagram for explaining the processes of the FIG. 5 flowchart.

A modification of the first embodiment is shown in FIG. 10. In this modification, a procedure is adopted of connecting nodes Fn with straight lines to generate a three-dimensional figure, letting a point P move on the generated three-dimensional figure all or part of the way from the initial point to the terminal point, dropping a perpendicular from the point P to a straight line connecting the initial and terminal points, and calculating the evaluated height h as the length of a perpendicular dropped to the straight line connecting the initial and terminal points from a center of gravity G at a part the perpendicular passes through.

The products of the length of the perpendicular and the displacements in the respective axial directions of a midpoint of the aforesaid perpendicular and the center of gravity G are all 0 when integrated in the direction of the straight line connecting the initial point and terminal point of the three-dimensional figure. Therefore, in a new three-dimensional space coordinate system whose initial point lies at (0, 0, 0) and terminal point lies on the x axis, the products of the displacements in the respective axial directions and the length of the perpendicular are represented as functions of x and the coordinate of the center of gravity G is calculated so that each becomes 0 when integrated in the x-axis direction. Alternatively, nodes Fn can be connected with curved lines.

Figure 11:
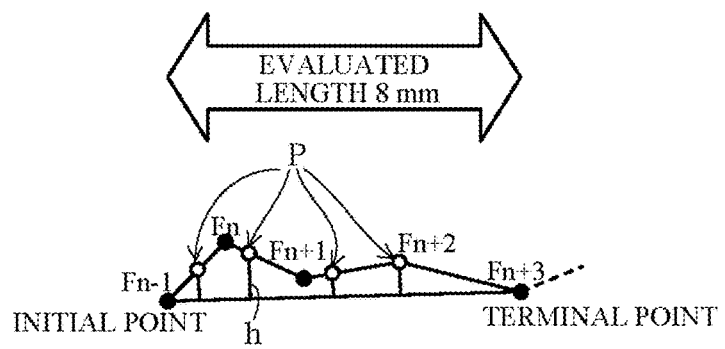
FIG. 11 is a similar explanatory diagram for explaining the processes of the FIG. 5 flowchart.

A modification of the first embodiment is shown in FIG. 11. In this modification, a procedure is adopted of generating a three-dimensional figure by connecting nodes Fn with straight lines, generating multiple points P on the generated three-dimensional figure, and calculating the evaluated height h as the maximum value of the lengths of perpendiculars dropped from the points P to a straight line connecting the initial point and terminal point. Alternatively, nodes Fn can be connected with curved lines.

Figure 12:
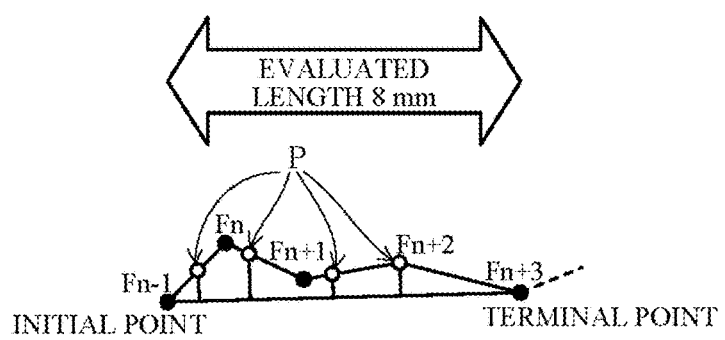
FIG. 12 is a similar explanatory diagram for explaining the processes of the FIG. 5 flowchart.

A modification of the first embodiment is shown in FIG. 12. In this modification, a procedure is adopted of generating a three-dimensional figure by connecting nodes Fn with straight lines, generating multiple points P on the generated three-dimensional figure, and calculating the evaluated height h as the average value of the lengths of perpendiculars dropped from the points P to a straight line connecting the initial point and terminal point. Alternatively, nodes Fn can be connected with curved lines.

The first embodiment and its modifications are configured to have the simulation program 20 that analyzes the behavior of the fiber-incorporating resin 16 during molding in the cavity 14c of the mold 14 under predetermined molding conditions, comprising steps of calculating, when analysis conditions including a minimum of 11 (multiple) nodes F per fiber 16a are inputted, a bending rate Af of the fiber 16a with respect to the evaluated length obtained from at least one node Fn among multiple nodes F anticipated under the molding conditions based on the inputted analysis conditions, and, more specifically, generating a three-dimensional figure by connecting nodes Fn with curved or straight lines, and calculating the bending rate Af of the fiber 16a based on the generated three-dimensional figure, and evaluating bending of the fiber 16a based on the calculated bending rate Af with respect to the evaluated length of the fiber 16a, so that by evaluating bending of the fiber 16a incorporated in the resin 16 as a numerical value, namely, bending rate Af with respect to the evaluated length of the fiber 16a, it becomes possible to evaluate bending of the fiber 16a quantitatively when analyzing behavior of the fiber-incorporating resin 16 during molding in the cavity 14c under predetermined molding conditions, and, moreover, easily and accurately calculate the bending rate Af of the fiber as a numerical value.

In the first embodiment and its modifications, the evaluated length are defined as a definite value (e.g., 8 mm) but it can be defined as an indefinite value (e.g., 4 mm, 6 mm, . . . 20 mm) instead.

(Second Embodiment)

Figure 13:
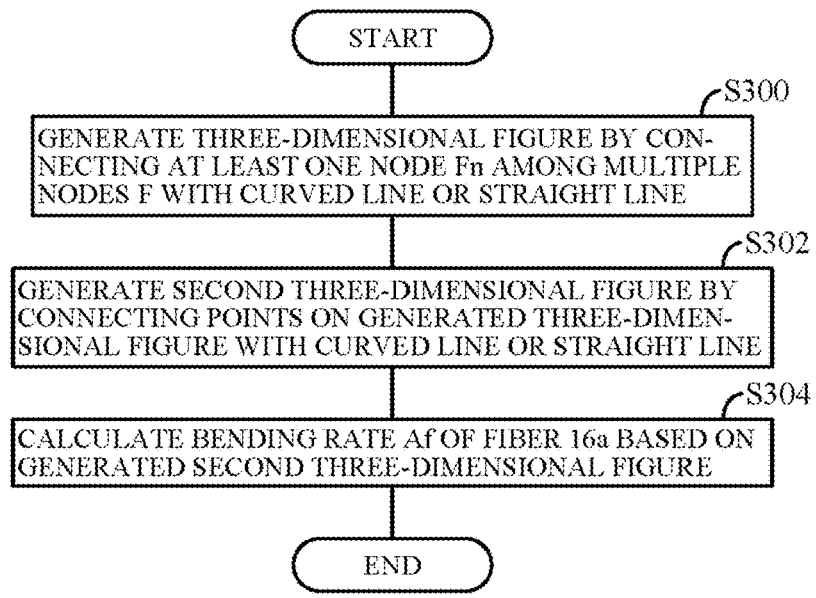
FIG. 13 is a flowchart similar to that of FIG. 5, but showing processes of a computer-aided resin behavior analyzer according to a second embodiment of this invention.
Figure 14:
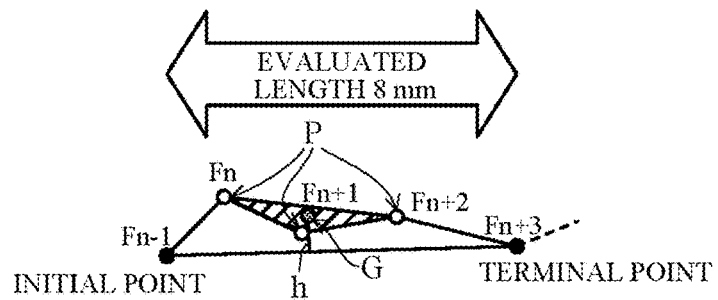
FIG. 14 is an explanatory diagram for explaining the processes of the flowchart of FIG. 13.
Figure 15:
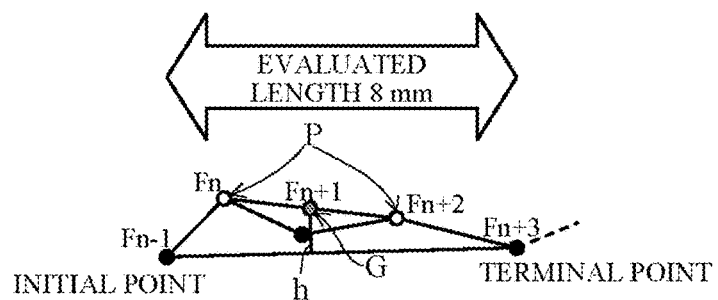
FIG. 15 is a similar explanatory diagram for explaining the processes of the flowchart of FIG. 13.

FIG. 13 is a flowchart similar to that of FIG. 5 showing processes of a computer-aided resin behavior analyzer 10 according to a second embodiment of this invention, and FIGS. 14 and 15 are explanatory diagrams for explaining the processes of the flowchart of FIG. 13.

Turning to an explanation with focus on points of difference from the first embodiment, a configuration is adopted wherein, in S300, similarly to in the first embodiment, a three-dimensional figure is generated by connecting at least one node Fn among multiple nodes F with a curved line or straight line, in S302 a second three-dimensional figure is generated by connecting points on the generated three-dimensional figure with curved lines or straight lines, and in S304 bending rate Af of the fiber 16a is calculated based on the generated second three-dimensional figure.

The bending rate Af is calculated based on ratio between the evaluated length of the fiber 16a and evaluated height of the second three-dimensional figure generated by connecting points on the three-dimensional figure generated by connecting nodes Fn selected from among multiple nodes F. The evaluated length is calculated as the length from the initial point to the terminal point of the three-dimensional figure.

As shown in FIG. 14, a procedure is adopted of selecting multiple points P from among nodes Fn, generating the second three-dimensional figure by connecting the multiple points P with straight lines, and calculating the evaluated height h as the length of a perpendicular dropped from a center of gravity G of the generated second three-dimensional figure to a straight line connecting the initial and terminal points of the three-dimensional figure. Coordinate of the center of gravity G is calculated as an average value of the coordinates of the multiple points P.

A modification of the second embodiment is shown in FIG. 15. In this modification, a procedure is adopted of connecting nodes Fn with straight lines to generate a three-dimensional figure, generating multiple points P on the generated three-dimensional figure, generating a second three-dimensional figure by connecting the multiple points P with straight lines, and calculating evaluated height h as the length of a perpendicular dropped from a center of gravity G of the generated second three-dimensional figure to a straight line connecting initial and terminal points of the three-dimensional figure. Coordinate of the center of gravity G is calculated as an average value of the coordinates of the multiple points P. Alternatively, nodes Fn can be connected with curved lines.

The second embodiment and its modifications are configured to have the simulation program 20 that analyzes the behavior of the fiber-incorporating resin 16 during molding in the cavity 14c of the mold 14 under predetermined molding conditions, comprising steps of calculating, when analysis conditions including a minimum of 11 (multiple) nodes F per fiber 16a are inputted, a bending rate Af of the fiber 16a with respect to the evaluated length obtained from at least one node Fn among multiple nodes F anticipated under the molding conditions based on the inputted analysis conditions, and, more specifically, generating a three-dimensional figure by connecting nodes Fn with curved or straight lines, generating a second three-dimensional figure by connecting points of the generated three-dimensional figure with curved or straight lines and calculating the bending rate Af of the fiber 16a based on the generated second three-dimensional figure, and evaluating bending of the fiber 16a based on the calculated bending rate Af with respect to the evaluated length of the fiber 16a, so that, in addition to the aforesaid effects and advantages, calculation of bending rate Af of the fiber as a numerical value is additionally facilitated.

Also in the second embodiment and its modifications, the evaluated length is defined as a definite value (e.g., 8 mm) but it can be defined as an indefinite value (e.g., 4 mm, 6 mm, . . . 20 mm) instead.

(Third Embodiment)

Figure 16:
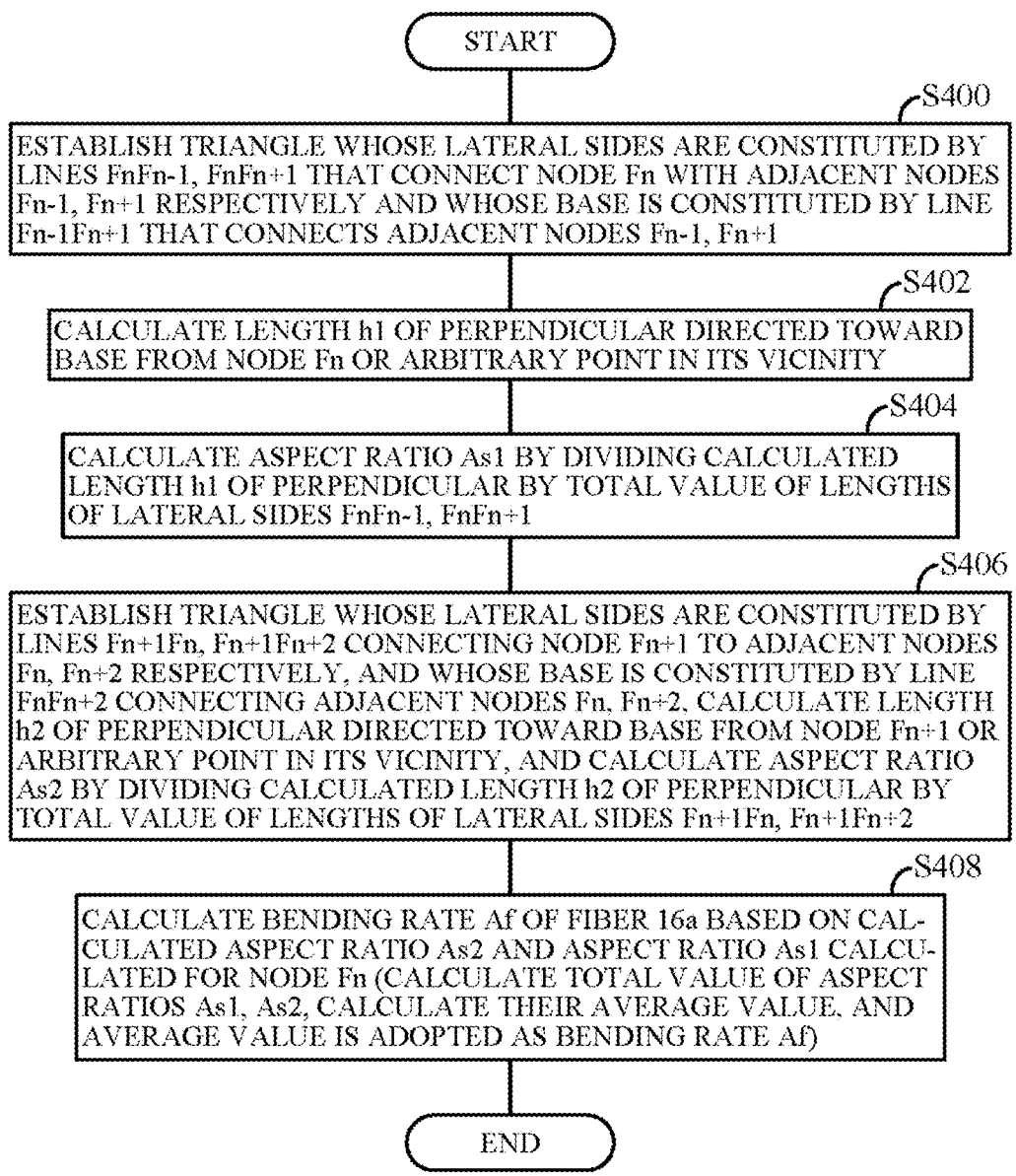
FIG. 16 is a flowchart similar to that of FIG. 5, but showing processes of a computer-aided resin behavior analyzer according to a third embodiment of this invention.

FIG. 16 is a flowchart similar to that of FIG. 5 showing processes of a computer-aided resin behavior analyzer 10 according to a third embodiment of this invention, and FIGS. 17 and 18 are explanatory diagrams for explaining the processes of the flowchart of FIG. 16. In this embodiment, a procedure is adopted of further generating a second three-dimensional figure as a triangle whose apexes are a point P and the initial and terminal points of a three-dimensional figure, and calculating height of the generated triangle as evaluated height h.

First, in S400, a triangle is established whose lateral sides are constituted by lines FnFn−1 and FnFn+1 that connect node Fn with adjacent nodes Fn−1 and Fn+1, respectively, (corresponding to evaluated length) and whose base is constituted by line Fn−1Fn+1 that connects adjacent nodes Fn−1 and Fn+1. In FIG. 18, the lateral sides and base are designated a, b, c for convenience of illustration.

Next, in S402, length h1 of a perpendicular directed toward the base from node Fn or an arbitrary point in the vicinity thereof is calculated. Although the perpendicular is directed toward the base from node Fn in the illustrated example, it can instead be directed toward the base from an arbitrary point in the vicinity of node Fn.

Next, in S404, an aspect ratio As1 is calculated by dividing the calculated length h1 of the perpendicular by the total value of the lengths of the lateral sides FnFn−1 and FnFn+1 (evaluated length). Thus the aspect ratio is calculated using three nodes.

Next, in S406, adjacent nodes are similarly processed.

Namely, a triangle is established whose lateral sides are constituted by lines Fn+1Fn and Fn+1Fn+2 connecting node Fn+1 to adjacent nodes Fn and Fn+2, respectively, and whose base is constituted by a line FnFn+2 connecting adjacent nodes Fn and Fn+2, length h2 of a perpendicular directed toward the base from node Fn+1 or an arbitrary point in the vicinity thereof is calculated, and an aspect ratio As2 is calculated by dividing the calculated length h2 of the perpendicular by the total value of the lengths of lateral sides Fn+1Fn and Fn+1Fn+2, whereafter similar processing is repeated up to the end of the fiber 16a.

Specifically, denoting every following node (or end) by generic term m, a triangle is established whose lateral sides are constituted by lines Fn+2Fn+1 and Fn+2Fn+m connecting node Fn+2 to adjacent/nonadjacent nodes Fn+1 and Fn+m, respectively, as lateral sides, and whose base is constituted by a line Fn+1Fn+m connecting adjacent nodes Fn+1 and Fn+m, length hm of a perpendicular directed toward the base from node Fn+2 or an arbitrary point in the vicinity thereof is calculated, and an aspect ratio Asm is calculated by dividing the calculated length hm of the perpendicular by the total value of the lengths of lateral sides Fn+2Fn+1 and Fn+2Fn+m.

Next, in S408, bending rate Af of the fiber is calculated with respect to the length of the fiber 16a based on calculated aspect ratio As2, aspect ratio As1 calculated for node Fn, and aspect ratios Asm calculated for nodes thereafter up to the end.

Specifically, the total value of aspect ratios As1, As2, Asm is calculated, the average value thereof is calculated, and the average value is used to calculate the bending rate Af of the fiber 16a, more exactly, is adopted as the bending rate Af of the fiber 16a.

Processes indicated in the flowchart of FIG. 16 are shown in FIGS. 17 and 18.

Figure 19:
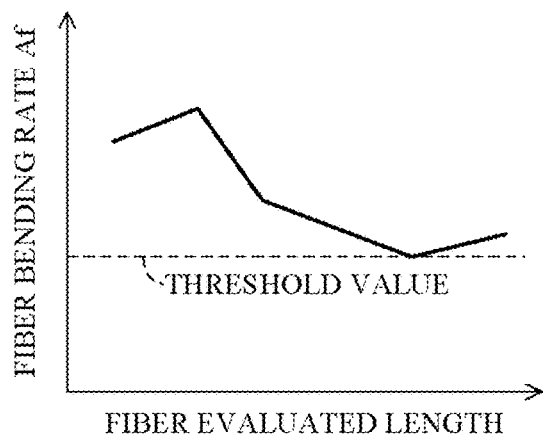
FIG. 19 is an explanatory diagram for explaining the process of S100 of the flowchart of FIG. 3.

The bending rate Af of a single fiber 16a is calculated with respect to evaluated length by the processing in S100 of the flowchart of FIG. 3, and FIG. 19 is an explanatory diagram showing the calculation. As illustrated, calculation of fiber 16a bending ratio with respect to evaluated length is performed by graphing the relationship between evaluated length and bending rate Af (aspect ratio As) of the fiber 16a at that length and comparing with a threshold value.

In S102 of the flowchart of FIG. 3, the bending of the fiber 16a is evaluated based on the calculated bending rate Af with respect to the evaluated length.

Figure 20:
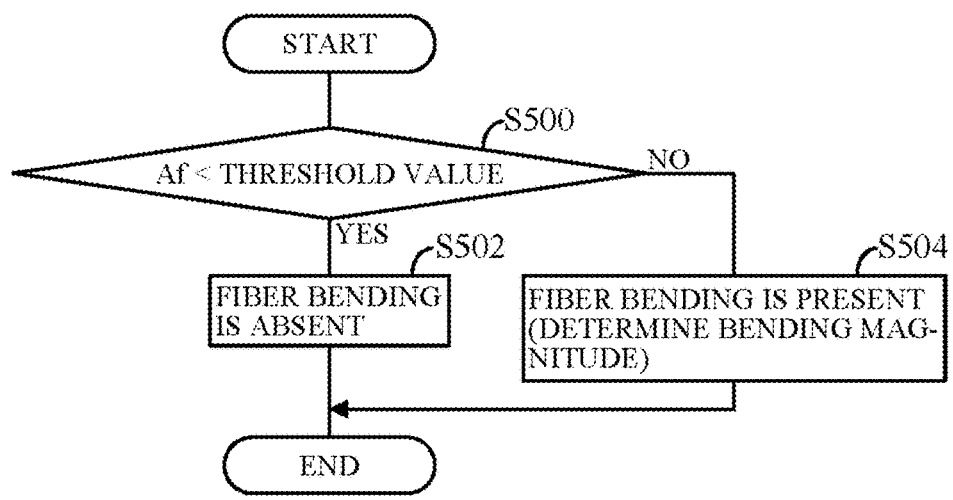
FIG. 20 is a subroutine flowchart of processes in S102 of the flowchart of FIG. 3.

FIG. 20 is a flowchart showing this process.

Now to explain, in S500 the calculated bending rate Af (aspect ratio As) with respect the evaluated length of the fiber 16a is compared with a predetermined threshold value, and it is determined whether the bending rate Af is below the threshold value. When the result is YES the program goes to S502, in which it is determined that bending of the fiber 16a with respect to the evaluated length is absent.

On the other hand, when the result in S500 is NO, the program goes to S504, in which it is determined that bending of the fiber 16a with respect to the evaluated length is present. Alternatively, it is possible to determine bending magnitude in S504 by comparing bending rate Af with appropriately defined second and third threshold values.

Figure 21:
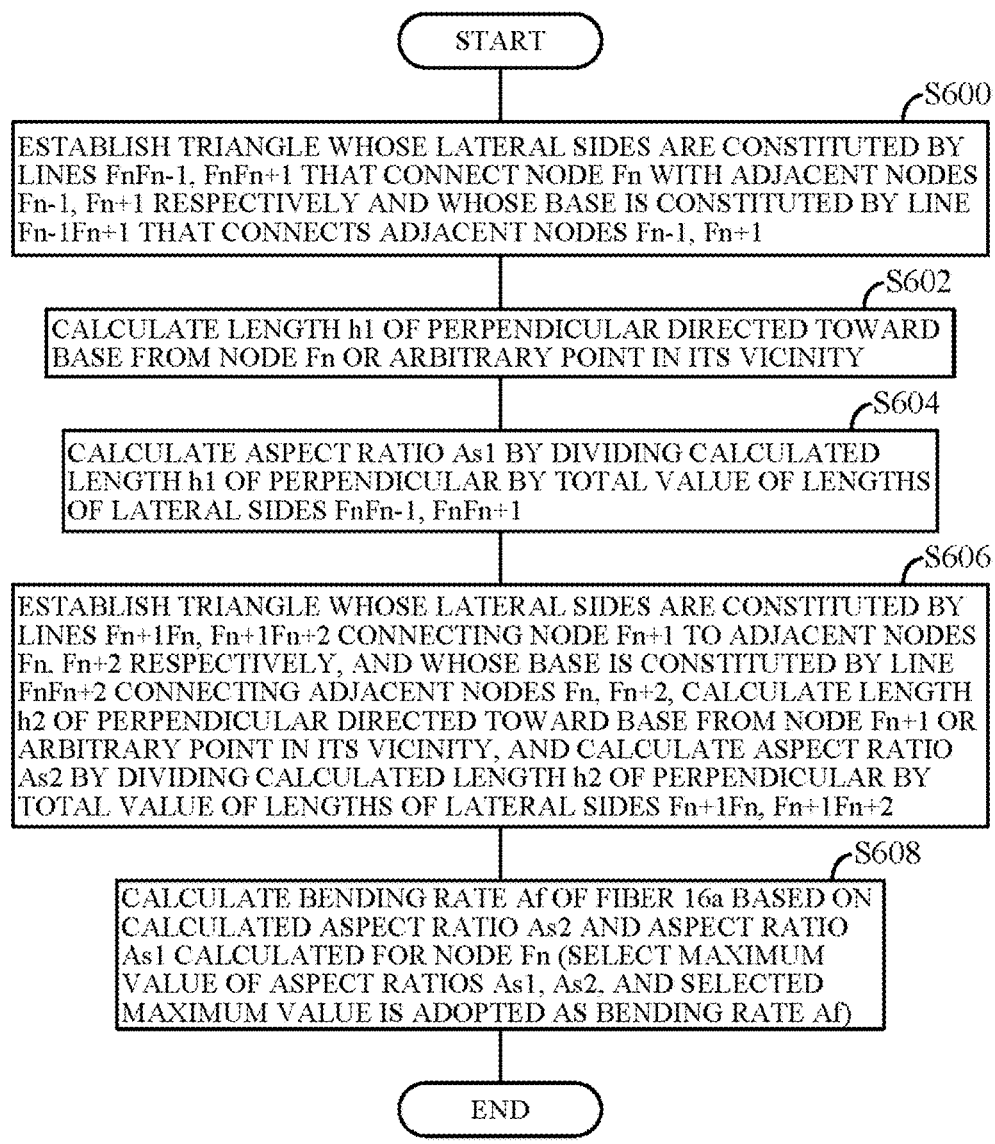
FIG. 21 is a flowchart similar to FIG. 16, but showing a modification of the third embodiment.

FIG. 21 is a flowchart similar to FIG. 16, but showing a modification of the third embodiment.

In this modification, the same processes as in FIG. 16 are performed in S600 to S606, whereafter the program goes to S608, in which aspect ratios As1, As2, Asm are calculated, the maximum value among them is selected, and this maximum value is used to calculate the bending rate Af of the fiber 16a, more exactly, is adopted as the bending rate Af of the fiber 16a.

Figure 22:
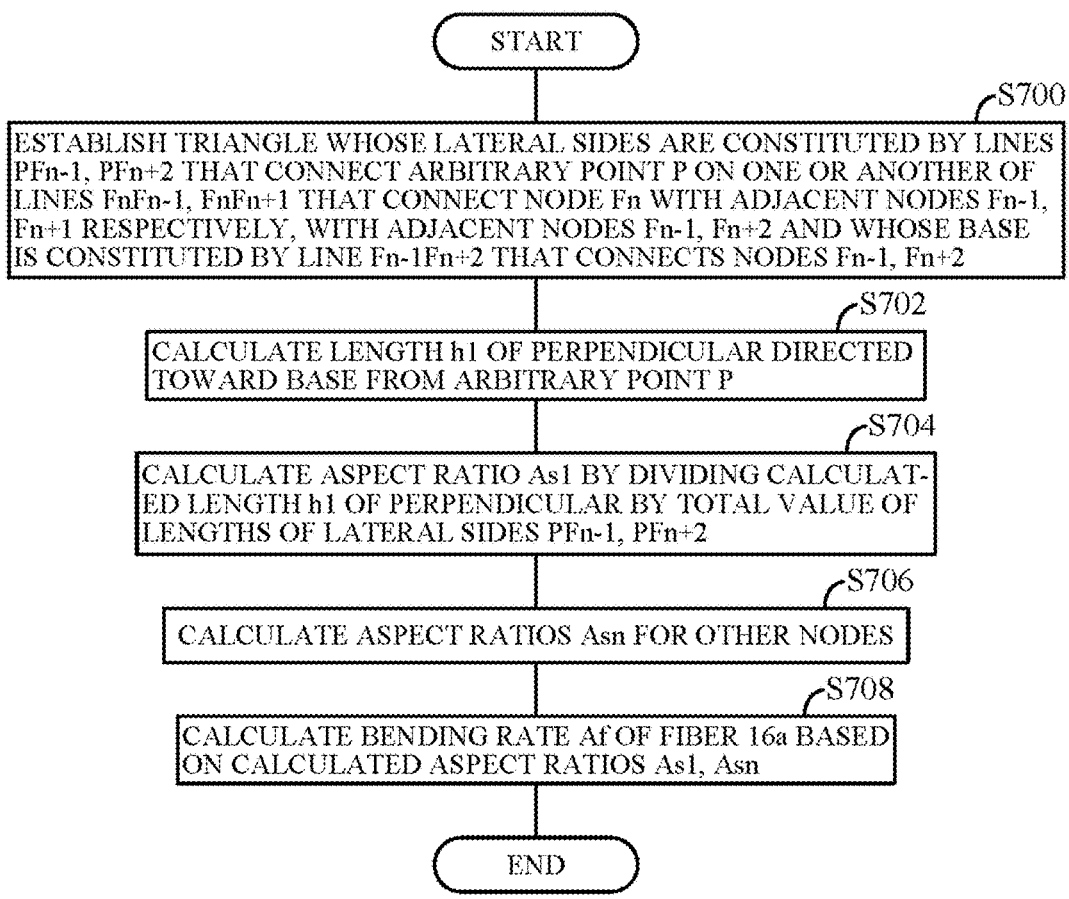
FIG. 22 is a flowchart similar to FIG. 16 similarly showing a modification of the third embodiment.
Figure 23:
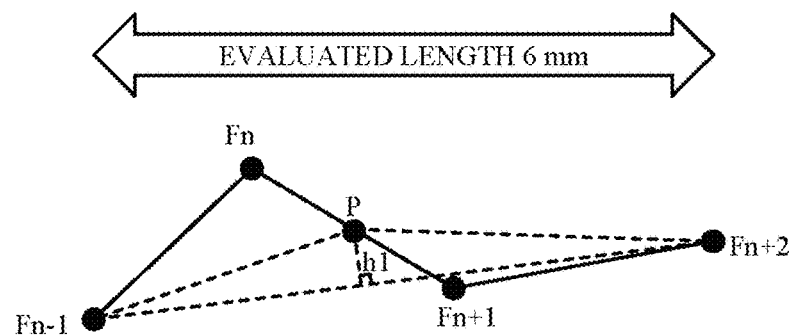
FIG. 23 is an explanatory diagram for explaining the processes of the FIG. 22 flowchart.

FIG. 22 is a flowchart similar to FIG. 16, but showing a modification of the third embodiment, and FIG. 23 is an explanatory diagram for explaining the processes of the FIG. 22 flowchart.

Now to explain, in S700 a triangle is established whose lateral sides are constituted by lines PFn−1 and PFn+2 that connect an arbitrary point P on one or another of lines FnFn−1 and FnFn+1 that connect node Fn with adjacent nodes Fn−1 and Fn+1, respectively, with adjacent nodes Fn−1 and Fn+2 and base is constituted by line Fn−1Fn+2 that connects nodes Fn−1 and Fn+2. Although arbitrary point P is denoted as a midpoint in the illustrated example, it should not be limited to this.

Next, in S702, length h1 of a perpendicular directed toward the base from arbitrary point P is calculated by the same processing as in FIG. 18.

Next, in S704, aspect ratio As1 is calculated by dividing the calculated length h1 of the perpendicular by the total value of the lengths of the lateral sides PFn−1 and PFn+2. Thus the aspect ratio is calculated using four nodes in the illustrated example.

Next, in S706, aspect ratios Asn for other nodes are successively calculated by the processing set out in S700 to S704. As the calculation of the aspect ratios itself is the same as in FIG. 18, illustration of Asn is omitted in FIG. 23.

Next, in S708, bending rate Af of the fiber 16a is calculated based on calculated aspect ratios As1, Asn. Specifically, the average value of the calculated aspect ratios As1, Asn is calculated and adopted as bending rate Af or the maximum value among the calculated aspect ratios As1, Asn is calculated and adopted as the bending rate.

Figure 24:
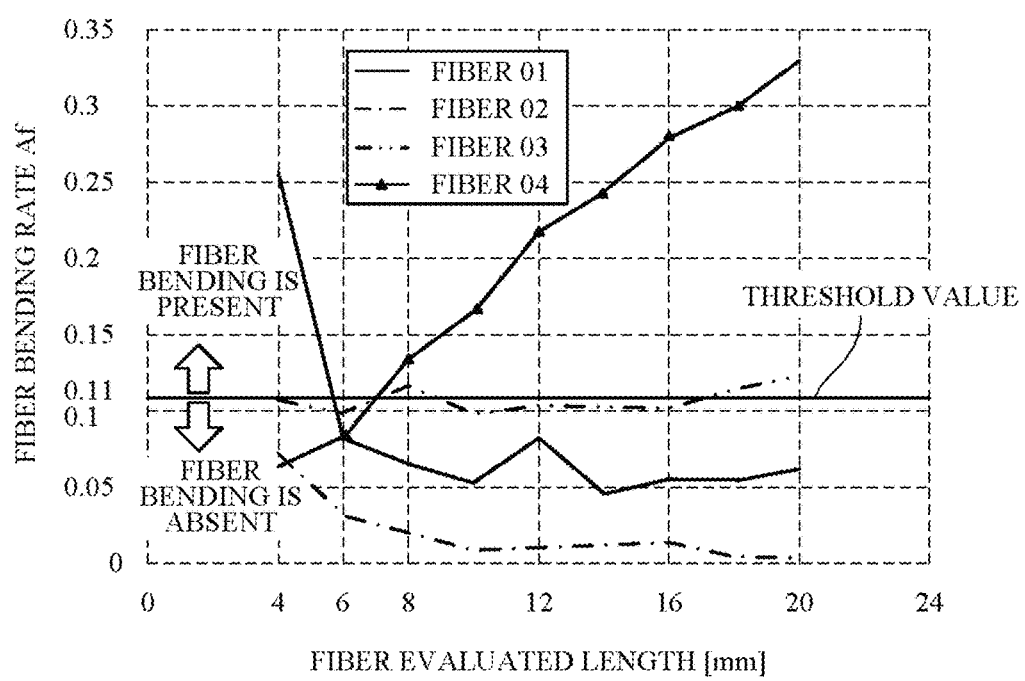

FIG. 24 shows the calculation results for the four types of fiber shown in FIG. 4. Thanks to the calculation as numerical values, among the examples of four types, fiber 01 (FIG. 3) can be evaluated to have bending (undulation) only at 4 mm and fine overall bending and fiber 02 can be evaluated to have no overall bending (undulation).

Further, fiber 03 can be evaluated as a fiber in which bending rate (aspect ratio) is large in both region of long length and region of short length and not only fine bending (undulation) but also large bending is present, and fiber 04 can be evaluated as a fiber in which bending ratio is large in region of long length, so that large bending but no fine bending (undulation) is present. Moreover, since it becomes possible to suitably discriminate bending of the fiber 16a, strength of the product 30 can be enhanced by adjusting the molding conditions.

Figure 25A:
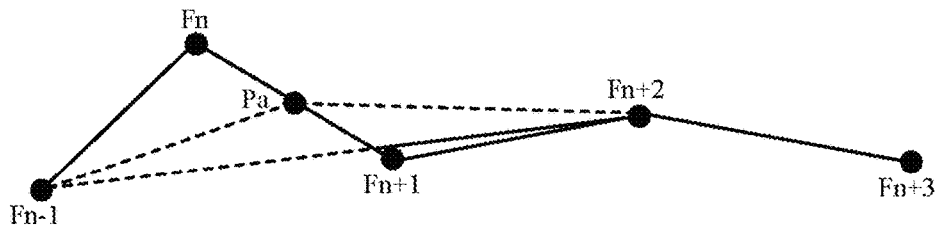
FIGS. 25A to 25C are a set of explanatory diagrams showing a modification of the third embodiment.
Figure 25B:
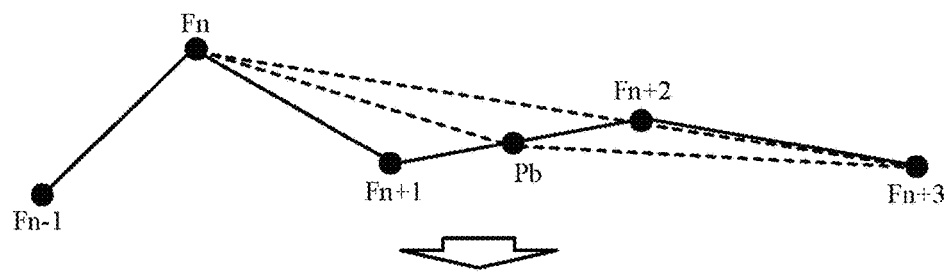
Figure 25C:
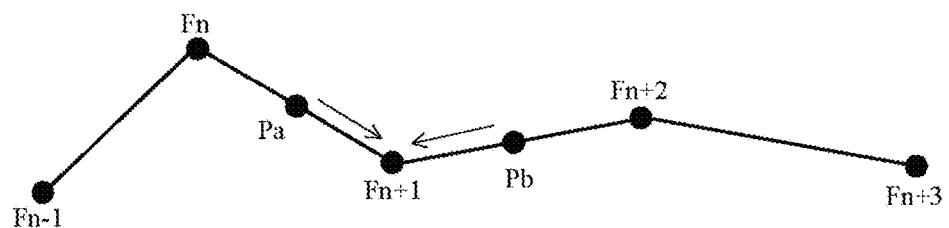

As a modification of the third embodiment, as shown in FIGS. 25A to 25C, when a midpoint is not made a node, a value inwardly interpolated (averaged) from surrounding points can be defined as node Fn+1, as shown in 25A and 25B of the same drawing.

Figure 26:
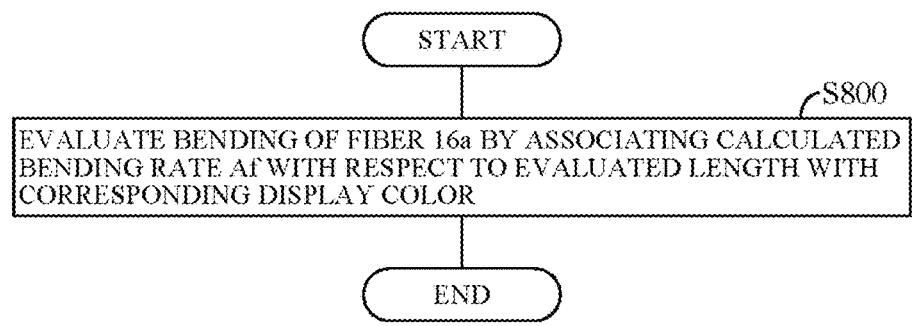
FIG. 26 is a flowchart showing a modification of the third embodiment.

FIG. 26 is a flowchart showing a modification of the third embodiment.

Figure 27:
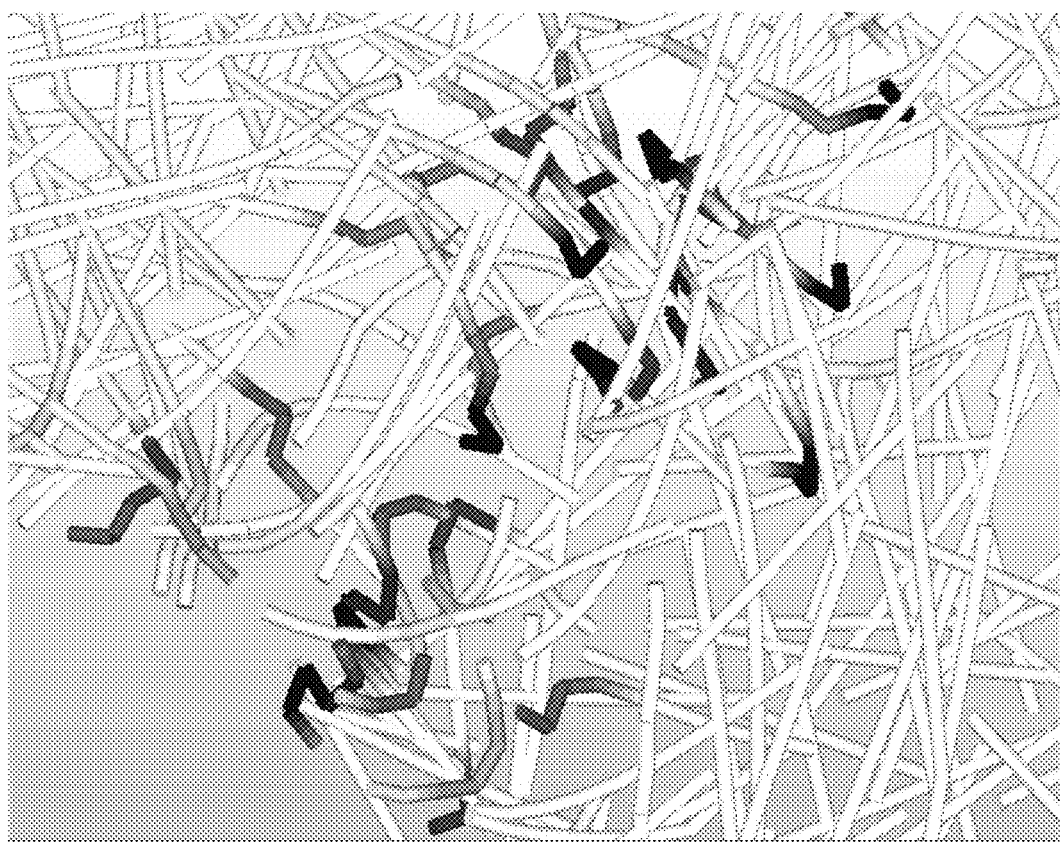
FIG. 27 is a photograph showing an example analysis result according to the third embodiment.

Now to explain, in S800, bending rate Af calculated with respect to evaluated length of the fiber 16a is associated with a corresponding display color and bending of the fiber 16a is evaluated. FIG. 27 is a photograph showing an example analysis result according to this embodiment.

The third embodiment and its modifications are configured to have the simulation program 20 that analyzes the behavior of the fiber-incorporating resin 16 during molding in the cavity 14c of the mold 14 under predetermined molding conditions, comprising steps of calculating, when analysis conditions including a minimum of 11 (multiple) nodes F per fiber 16a are inputted, a bending rate Af of the fiber 16a with respect to the evaluated length obtained from at least one node Fn among multiple nodes F anticipated under the molding conditions based on the inputted analysis conditions, and, more specifically, generating a three-dimensional figure by connecting nodes Fn with straight lines, generating a triangle by connecting points of the generated three-dimensional figure with straight lines and calculating the bending rate Af of the fiber 16a based on the generated triangle, and evaluating bending of the fiber 16a based on the calculated bending rate Af with respect to the evaluated length of the fiber 16a, so that by evaluating bending of the fiber 16a incorporated in the resin 16 as a numerical value, namely, bending rate Af with respect to the evaluated length of the fiber 16a, in addition to the aforesaid effects and advantages, calculation of bending rate Af of the fiber as a numerical value is additionally facilitated. The remaining effects and advantages are no different from those of the first and second embodiments.

In the third embodiment and its modifications, the evaluated length is defined as a definite value (e.g., 4 mm, 6 mm) but it can be defined as an indefinite value (e.g., 4 mm, 6 mm, . . . 20 mm) instead.

In the first, second and third embodiments, the number of fiber 16a segments need not be limited to 10 and it is of course possible for the segment length to be irregular. Moreover, although calculation of aspect ratios Asn for all or some nodes starting from one end (initial end) to the other end (terminal end) of the fiber 16a is exemplified, it is possible instead to start from an intermediate part of the fiber 16a and also possible to calculate for only some of the nodes. Further, although calculation of aspect ratios using three or four nodes is exemplified, this is not a limitation. In addition, the number of fibers 16a should not be limited to one but can be two or more.

(Fourth Embodiment)

Figure 28:
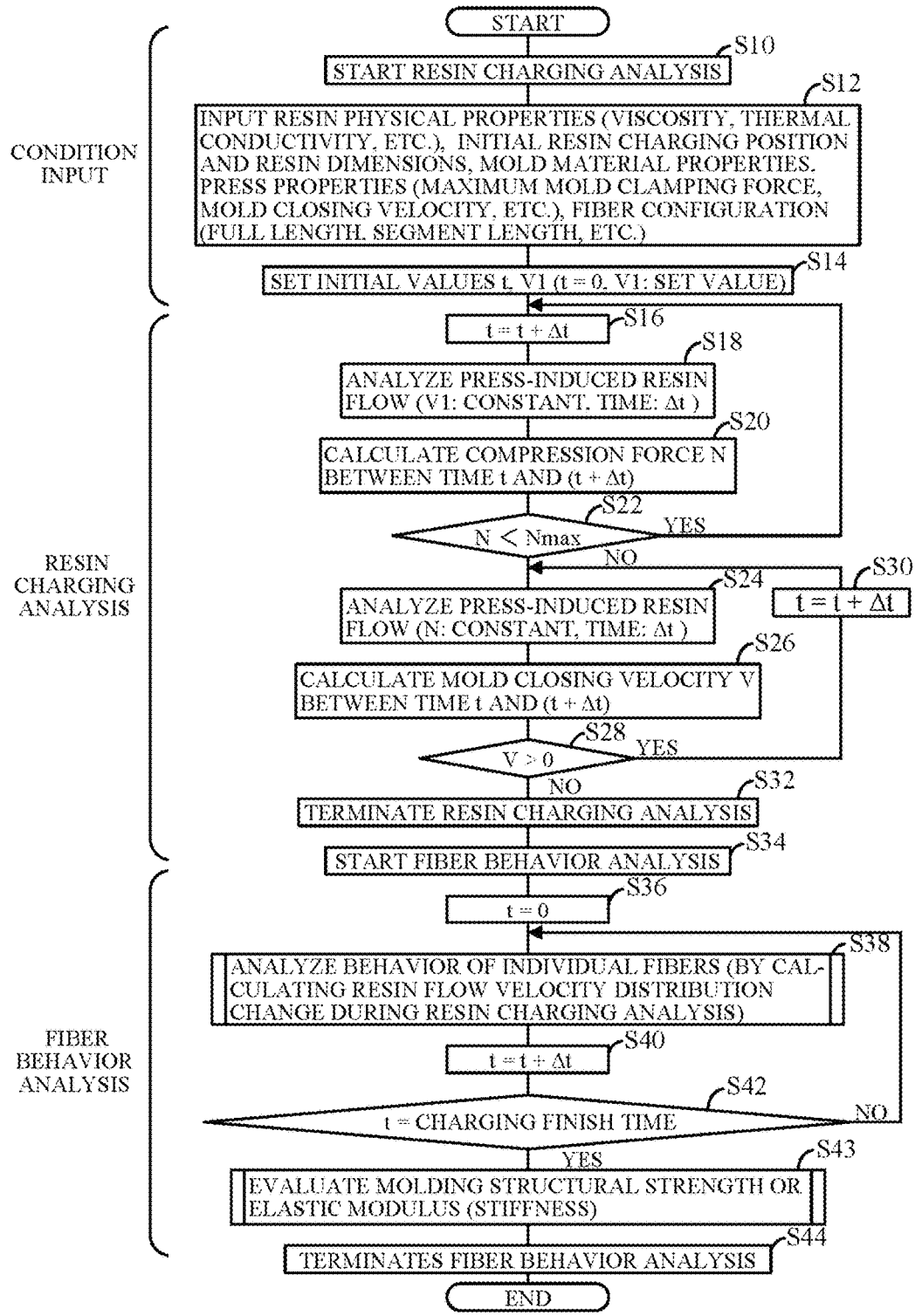
FIG. 28 is a flowchart showing processes of a simulation program installed on a computer of an analyzer according to a fourth embodiment.

FIG. 28 is a flowchart similar to that to FIG. 2, but showing processes (operations) performed by a computer-aided resin behavior analyzer 10 according to a fourth embodiment of this invention.

Looking first at the object of the fourth embodiment before moving into an explanation of FIG. 28, techniques have from the past been known for reducing structural strength degradation caused by fiber bending occurring during press molding of a fiber reinforced resin. Japanese Patent No. 5418684 ('684), for example, teaches that during production of a fiber reinforced resin material by charging resin into a cavity, a continuous fiber reinforcing material is placed on a core slidably provided inside a lower mold half and this is pressed upward to be buried in the resin.

Further, Japanese Unexamined Patent Publication No. 2013-022852A ('852) teaches that during production of a resin molding a fiber reinforced resin material is placed on a resin substrate as reinforcing material, pins are moved to penetrate through the fiber reinforced resin in a lower mold, and molding is performed by introducing the resin substrate through penetrated holes when drawing the pins.

In this connection, the techniques set out in the aforesaid publications '684 and '852 need to ascertain structural strength of prototypes (moldings) during research and development. Disadvantageously, since this requires actual moldings, it takes a great deal of time. It is conceivable to overcome this issue by using resin behavior analysis to predict molding structural strength or elastic modulus (stiffness), but no technology for analyzing molding structural strength degradation and elastic modulus (stiffness) degradation caused by fiber bending has been available.

Therefore, the object of the fourth embodiment of this embodiment is to overcome the problem mentioned above by providing a computer-aided resin behavior analyzer capable of predicting fiber bending-induced molding structural strength degradation or elastic modulus (stiffness) degradation by means of a simulation program installed on a computer that analyzes behavior of a fiber reinforced resin incorporating multiple continuous fibers and long discontinuous fibers during molding in a mold under predetermined molding conditions.

Now to explain the fourth embodiment with focus on the points of difference from the earlier embodiments, the program performs the processes up to S34 in the same manner as in the earlier embodiments to commence the fiber behavior analysis, and then goes to S36 to reset time t to 0. Next, in S38, the behavior of the fibers 16a is analyzed one fiber 16a at a time.

Figure 29:
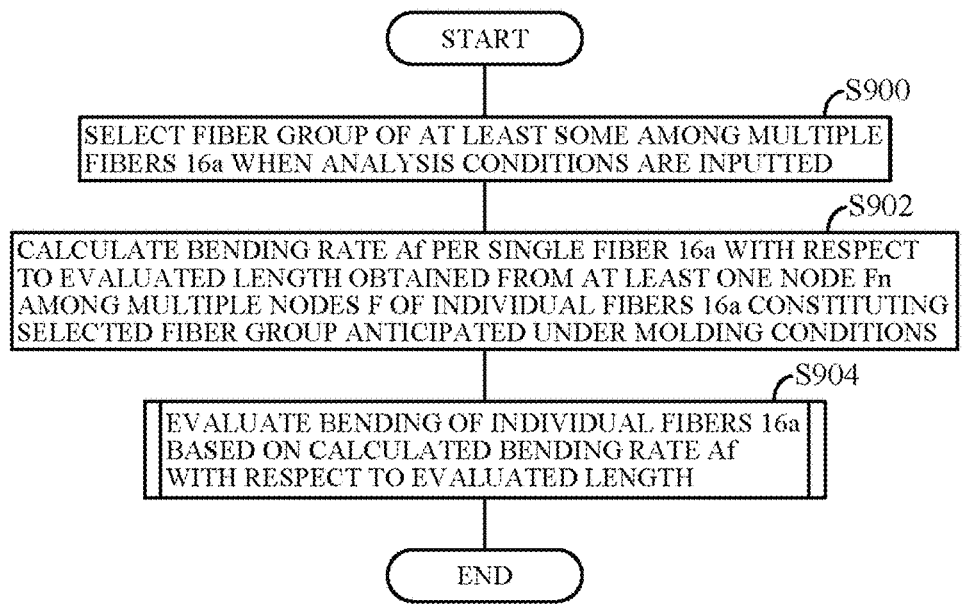
FIG. 29 is a subroutine flowchart of processes in S38 of the flowchart of FIG. 28.

FIG. 29 is a subroutine flowchart of processes in S38 of the flowchart of FIG. 28.

Now to explain, in S900, when analysis conditions including at least multiple nodes F of multiple fibers 16a incorporated in a resin 16 are inputted by the designer through the input devices 12b, a fiber group of at least some among the multiple fibers 16a is selected.

Next, in S902, with focus on the individual fibers 16a constituting the selected fiber group, a calculation is performed to determine a bending rate Af per single fiber 16a with respect to an evaluated length obtained from at least one node Fn among the multiple nodes F of the individual fibers 16a anticipated under the aforesaid molding conditions. As in the preceding embodiments, the analysis conditions include length of the fibers 16a, distance between nodes F, and shape of the product 30.

Next, in S904, bending of the individual fibers 16a is evaluated based on the calculated bending rate Af with respect to the evaluated length.

Figure 30:
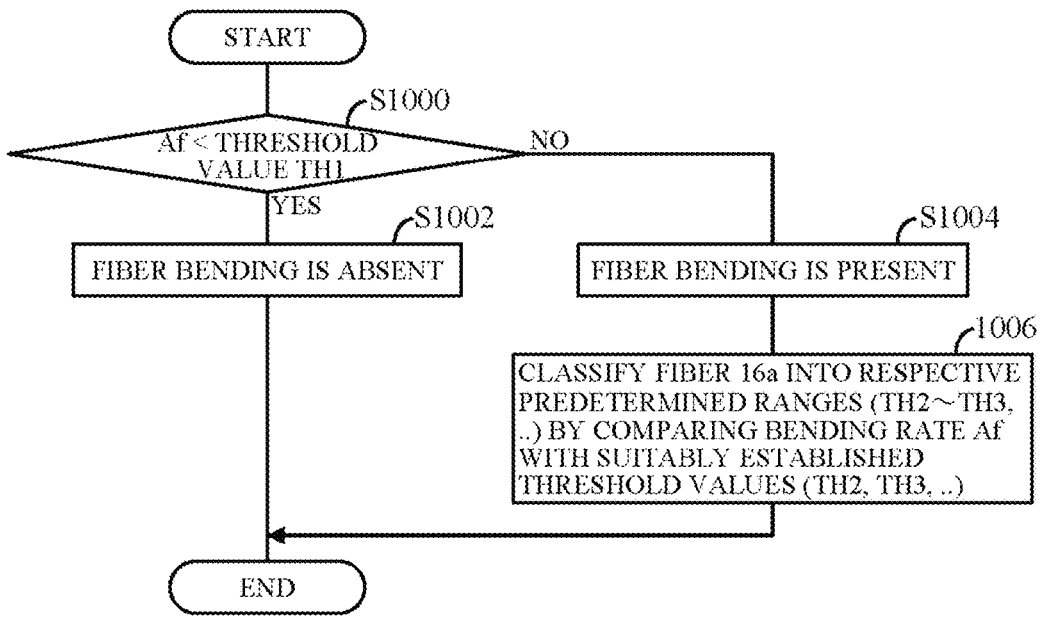
FIG. 30 is a subroutine flowchart of processes in S904 of the flowchart of FIG. 29.

FIG. 30 is a subroutine flowchart of processes in S904 of the flowchart of FIG. 29.

Now to explain, in S1000 the calculated bending rate Af (aspect ratio As) with respect the evaluated length of the fiber 16a is compared with a predetermined threshold value TH1, and it is determined whether the bending rate Af is below the threshold value. When the result is YES, the program goes to S1002, in which it is determined that bending of the fiber 16a with respect to the evaluated length is absent.

On the other hand, when the result in S1000 is NO, the program goes to S1004, in which it is determined that bending of the fiber 16a with respect to the evaluated length is present, and to S1006, in which the fiber 16a is classified into respective predetermined ranges by comparing the bending rate Af with suitably established second, third, . . . predetermined threshold values TH2, TH3, . . . .

In the flowchart of FIG. 28, the program next goes to S40, in which time is incremented by unit time Δt, whereafter, in S42, it is determined whether time t reached the charging finish time of the resin 16. When the result in S42 is NO, the program returns to S38, and when YES, goes to S43, in which molding structural strength or elastic modulus (stiffness) is evaluated.

Figure 31:
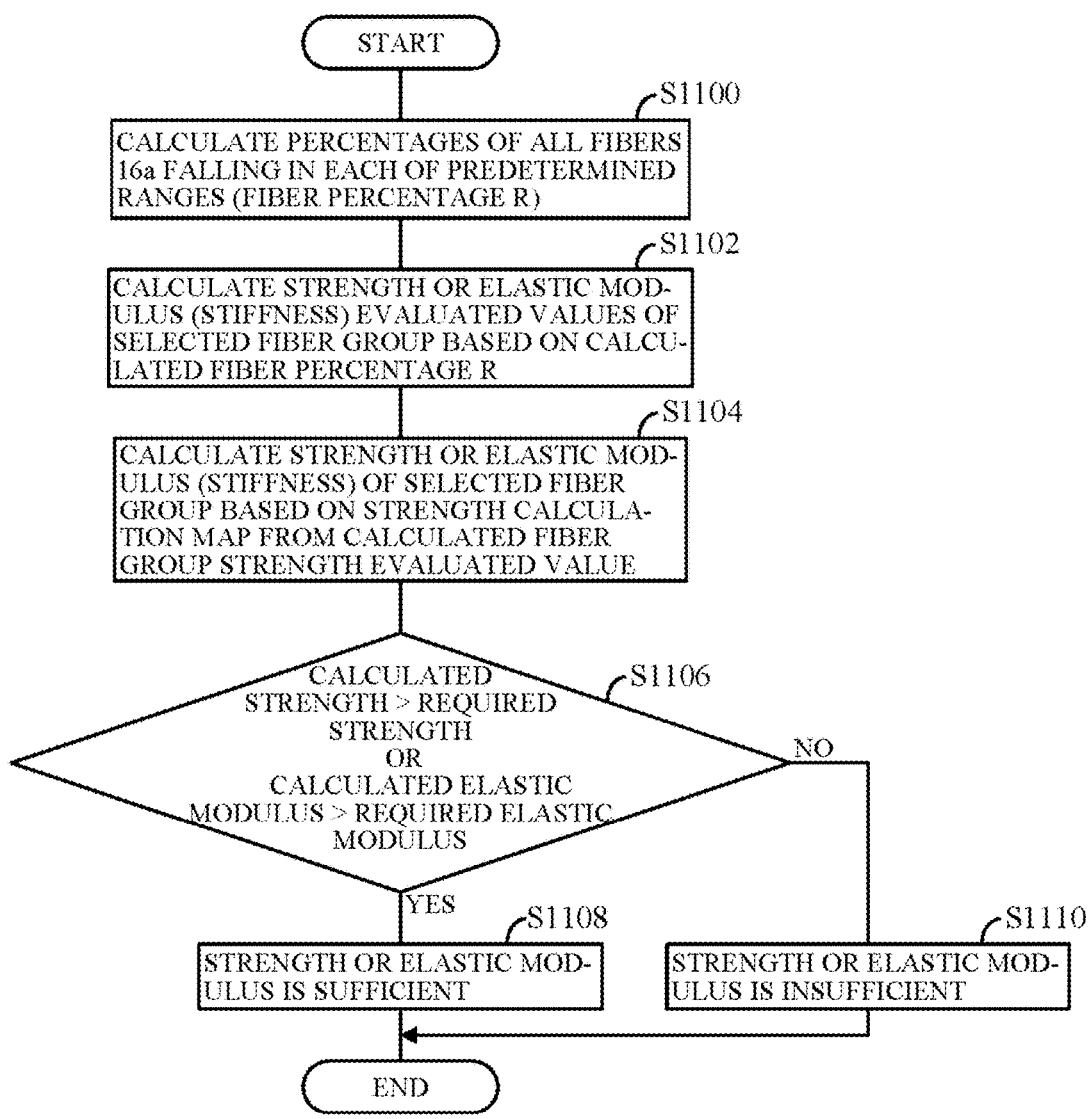
FIG. 31 is a subroutine flowchart of processes in S43 of the flowchart of FIG. 29.

FIG. 31 is a subroutine flowchart of processes in S43 of the flowchart of FIG. 28.

Now to explain, in S1100, the percentage of all fibers 16a falling in each of the predetermined ranges (bending not present, predetermined ranges of bending present) (fiber percentage R) is calculated. Namely, the percentage of the number of fibers 16a falling in each predetermined range relative to the total number of fibers 16a constituting the selected group is calculated.

Next, in S1102, a strength or elastic modulus (stiffness) evaluated value of the selected fiber group is calculated based on the calculated fiber percentages R. Specifically, in S1100 as many fiber percentages R as predetermined ranges are calculated for the selected fiber group, and among these the fiber percentages R of the ranges that have a particularly large impact on degradation of molding structural strength or elastic modulus (stiffness) are calculated as a strength or elastic modulus (stiffness) evaluated value.

Still more specifically, in S1000 of the flowchart of FIG. 30, the total of the fiber percentages R of all ranges equal to or higher than the predetermined threshold value TH1 (TH1-TH2, TH2-TH3, . . . ) in which bending is determined to be present is calculated as the strength or elastic modulus (stiffness) evaluated value.

Figure 32:
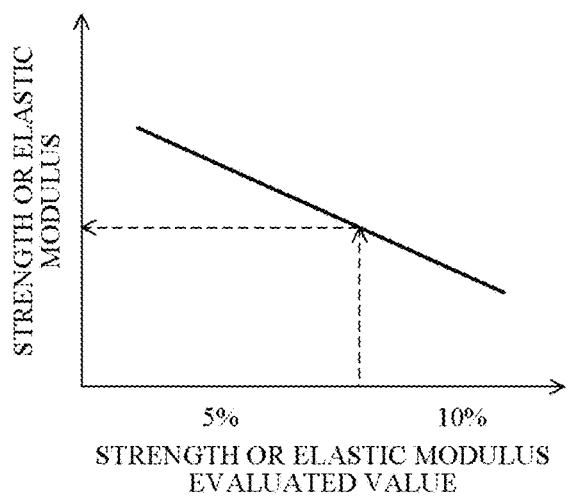
FIG. 32 is an explanatory diagram showing an example of a strength or elastic modulus (stiffness) calculation map of the flowchart of FIG. 31.

Next, in S1104, strength or elastic modulus (stiffness) of the selected fiber group is calculated based on characteristics derived beforehand from the calculated fiber group strength or elastic modulus (stiffness) (i.e., a strength or elastic modulus (stiffness) calculation map). In other words, strength or elastic modulus (stiffness) corresponding to the strength or elastic modulus (stiffness) evaluated value is calculated by referring to a strength or elastic modulus (stiffness) calculation map such as shown in FIG. 32, whereafter the program goes to S1106, in which it is determined whether required strength or elastic modulus (stiffness) is satisfied. The strength or elastic modulus (stiffness) map is compiled in advance by experimentation or the like.

When the result in S1106 is YES, the program goes to S1108, in which elastic modulus (stiffness) is determined to be sufficient or adequate, and when NO, to S1110, in which strength or elastic modulus (stiffness) is determined to be insufficient or inadequate. When strength or elastic modulus (stiffness) is insufficient, the molding conditions are to be changed to enhance the strength or elastic modulus (stiffness) of the product 30.

Figure 33:
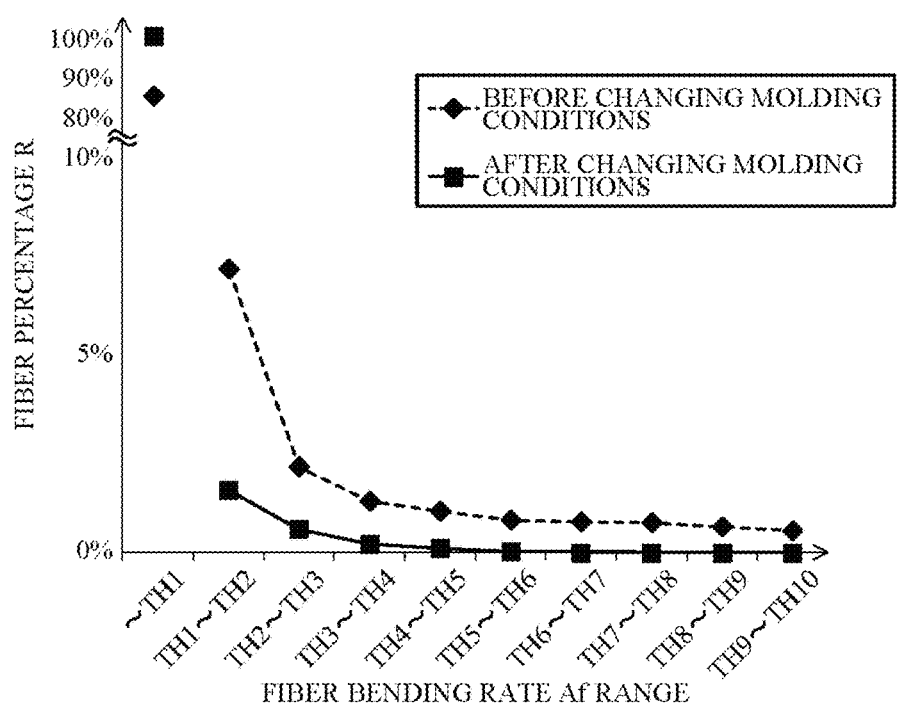
FIG. 33 is an explanatory diagram showing fiber percentage calculation results obtained in the processes of FIG. 31.

FIG. 33 is a histogram representing fiber percentage R for every predetermined range of fiber 16a bending rate Af and showing an example of comparison of strength or elastic modulus (stiffness) evaluated value calculation results between before and after changing the molding conditions.

Fiber percentage R increased from about 85% to about 97% in the range of fiber 16a bending rate Af of 0 to TH1 (bending not present) but fiber percentage R decreased in all ranges from TH1 on up (bending present), namely, the total value of fiber percentages R of ranges TH1 upward decreased from about 15% to about 3% and overall bending of the selected fiber group (fiber group corresponding to the range evaluated for strength or elastic modulus (stiffness) in the molding) is suppressed, from which it can be ascertained numerically that the strength or elastic modulus (stiffness) of the molding improved.

The program next goes to S44 in the flowchart of FIG. 28 and the fiber behavior analysis is terminated.

Figure 34:
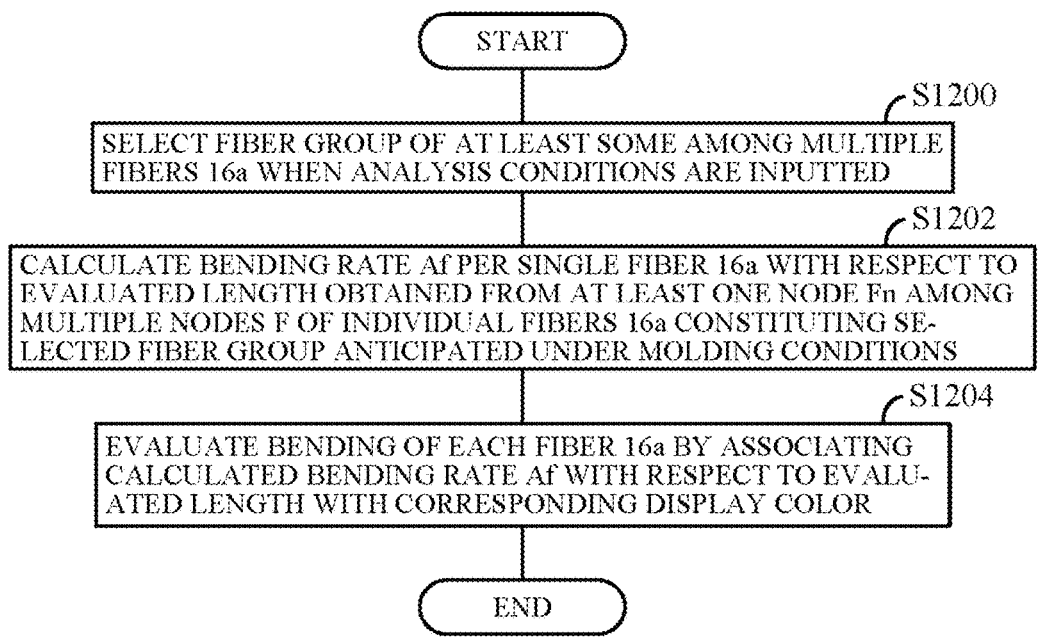
FIG. 34 is a flowchart similar to FIG. 29, but showing a modification of the fourth embodiment.

FIG. 34 is a flowchart similar to FIG. 29, but showing a modification of this fourth embodiment.

In this modification, the same processes as in FIG. 29 are performed in S1200 to S1202, whereafter the program goes to S1204, in which bending rate Af calculated with respect to evaluated length of each fiber 16a by associating bending rate Af with respect to evaluated length of fiber 16a with a corresponding display color.

In S43 of the flowchart of FIG. 28, molding structural strength or elastic modulus (stiffness) is evaluated. Concretely speaking, the evaluation comprises processing for evaluating strength or elastic modulus (stiffness) of the selected fiber group based on the bending evaluation results obtained for the individual fibers 16a and evaluating overall strength or elastic modulus (stiffness) of multiple fibers 16a based on such strength or elastic modulus (stiffness) evaluation results.

Figure 35:
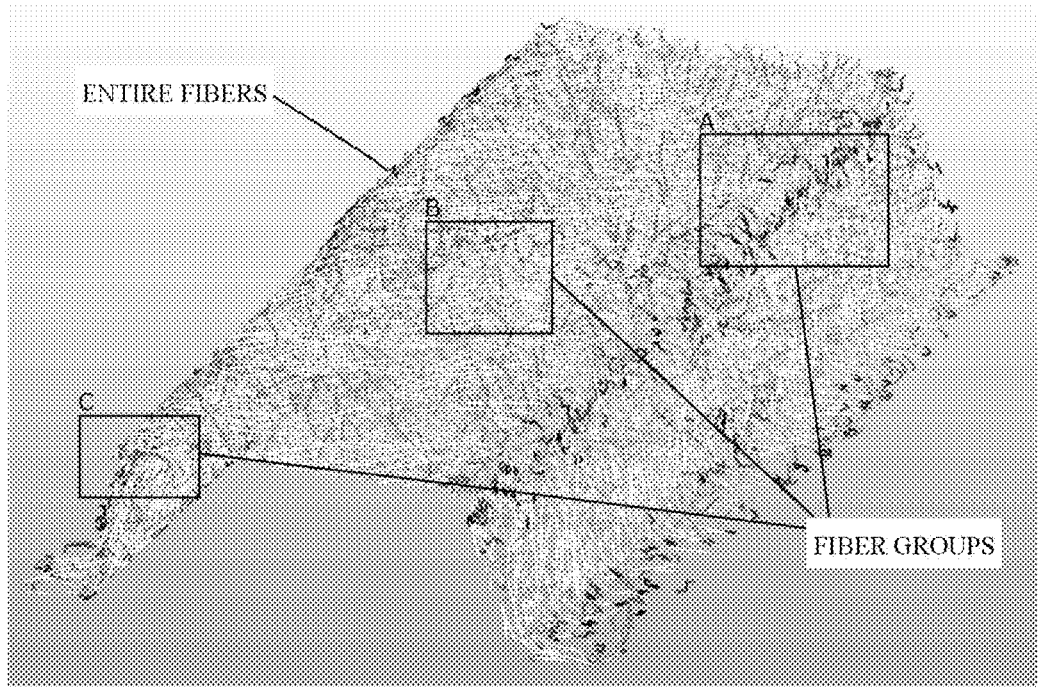
FIG. 35 is a photograph showing an example of analysis result according to the fourth embodiment.
Figure 36:
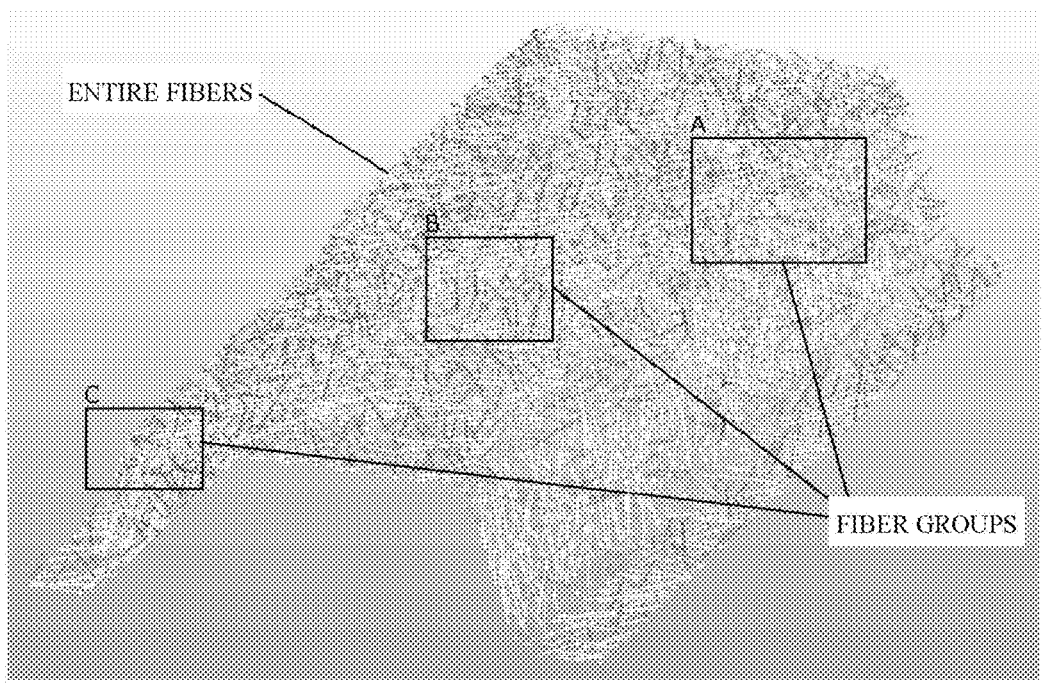
FIG. 36 is a similar photograph showing an example of analysis result according to the fourth embodiment.

FIGS. 35 and 36 are photographs showing examples of analysis results in this fourth embodiment before changing and after changing the molding conditions, respectively. FIGS. 35 and 36 are overall images of multiple fibers 16a, i.e., overall images of moldings when resin 16 incorporating multiple fibers 16a is molded in the mold 14. In the illustrated fiber group, i.e., molding, examples of the fiber groups corresponding to the ranges in which strength or elastic modulus (stiffness) is evaluated are indicated by symbols A, B and C.

As presence/absence and magnitude of fiber 16a bending are contour-displayed using display colors, serious fiber bending in the molding can be readily discerned, bending of the entire selected fiber group before/after molding conditions change is suppressed, and improvement of molding strength or elastic modulus (stiffness) can be visually confirmed.

The fourth embodiment and its modifications are configured to have the computer-aided resin behavior analyzer 10 that analyze bending behavior of multiple continuous fibers and long discontinuous fibers 16a incorporated in a resin 16 during molding in the mold 14 under predetermined molding conditions through the simulation program 20 installed on the computer 12, wherein the simulation program 20 comprises the steps of: selecting a fiber group of at least some among the multiple fibers 16a when the analysis conditions including at least multiple nodes F of the multiple fibers 16a are inputted (S900), calculating bending rates Af of individual fibers 16a constituting the selected fiber group based on the inputted analysis conditions (S902), evaluating bending of individual fibers 16a based on the bending rates Af calculated for the individual fibers 16a (S904), and evaluating strength or elastic modulus (stiffness) of the selected fiber group based on the bending evaluation results of the individual fibers 16a obtained (S43), so that by evaluating bending based on the bending rate Af of the individual fibers 16a and evaluating strength or elastic modulus of the selected group based on such evaluation results, structural strength degradation and elastic modulus degradation of the molding caused by fiber bending can be predicted.

As stated above, the first, second, third and fourth embodiments and their modifications of this invention are configured to have a computer-aided resin behavior analyzer 10 that analyze bending behavior of a continuous fiber and long discontinuous fiber 16a incorporated in a resin 16 during molding in a mold 14 under predetermined molding conditions through a simulation program 20 installed on a computer 12, wherein the simulation program 20 comprises the steps of: calculating, when analysis conditions including at least multiple nodes F of the fiber is inputted, a bending rate Af of the fiber 16a with respect to an evaluated length obtained from at least one node Fn among multiple nodes F anticipated under the molding conditions based on the inputted analysis conditions (S100), and evaluating bending of the fiber based on the calculated bending rate Af with respect to the evaluated length (S102, S500 to S504, S800).

With this, by evaluating bending rate Af with respect to the evaluated length of the fiber 16a as a numerical value, it becomes possible to evaluate bending of the incorporated fiber 16a quantitatively when analyzing behavior of the fiber-incorporating resin 16 during molding in the cavity 14c under predetermined molding conditions.

Specifically, it becomes possible to evaluate bending rate or magnitude differing in mode quantitatively by evaluating bending rate of fine undulation (small bending) at small evaluated length and of large bending at large evaluation length. Also, it becomes possible to evaluate bending rate or magnitude of combined small-and-large bending.

In addition, by making it possible to evaluate bending of the fiber 16a appropriately, it becomes possible to discover conditions for minimizing bending of the fiber 16a easily, and hence, it becomes possible to vary the molding conditions in order to increase strength of the product 30.

In the first embodiment and its modifications, the step of calculating the bending rate Af of the fiber 16a comprises a step of: calculating the bending rate Af of the fiber based on a three-dimensional figure generated by connecting at least one node Fn among the multiple nodes F with a curved line or straight line (S200, S202). With this, in addition to the effects and advantages mentioned above, it becomes possible to easily and accurately calculate the bending rate Af of the fiber 16a as a numerical value.

In the second embodiment and its modifications, the step of calculating the bending rate Af of the fiber 16a comprises a step of: calculating the bending rate Af of the fiber based on a second three-dimensional figure generated by connecting with curved lines or straight lines points on a three-dimensional figure generated by connecting at least one node Fn among the multiple nodes F with a curved line or straight line (S300 to S304). With this, in addition to the effects and advantages mentioned above, it becomes possible to more easily calculate the bending rate Af of the fiber 16a as a numerical value.

In the third embodiment and its modifications, the second three-dimensional figure comprises a triangle. With this, in addition to the effects and advantages mentioned above, it becomes possible to more easily calculate the bending rate Af of the fiber 16a as a numerical value.

And, the step of calculating the bending rate Af of the fiber 16a comprises step of: establishing the triangle to have lateral sides constituted by lines FnFn−1 and FnFn+1 that connect the node Fn with adjacent nodes Fn−1 and Fn+1, respectively, and a base constituted by a line Fn−1Fn+1 that connects adjacent nodes Fn−1 and Fn+1 (S400, S600), calculating length h1 of a perpendicular directed toward the base from the node Fn or an arbitrary point in the vicinity thereof (S402, S602), calculating an aspect ratio As1 by dividing the calculated length h1 of the perpendicular by the total value of the lengths of the lateral sides FnFn−1 and FnFn+1 (S404, S604), and calculating the bending rate Af of the fiber based on the calculated aspect ratio As1 (S408, S608). With this, in addition to the effects and advantages mentioned above, it becomes possible to easily calculate the bending rate Af of the fiber 16a as a numerical value.

And, the step of calculating the bending rate Af of the fiber 16a comprises steps of: establishing the triangle to have lateral sides constituted by lines Fn+1Fn and Fn+1Fn+2 that connect the node Fn+1 with adjacent nodes Fn and Fn+2, respectively, and a base constituted by a line FnFn+2 that connects adjacent nodes Fn and Fn+2 (S406, S606), calculating length h2 of a perpendicular directed toward the base from the node Fn+1 or an arbitrary point in the vicinity thereof, calculating an aspect ratio As2 by dividing the calculated length h2 of the perpendicular by the total value of the lengths of the lateral sides Fn+1Fn and Fn+1Fn+2 (S406, S606), and calculating the bending rate Af of the fiber based on the calculated aspect ratio As2 and the aspect ratio As1 calculated with respect to the node Fn (S408, S608). With this, in addition to the effects and advantages mentioned above, it becomes possible to easily and accurately calculate the bending rate Af of the fiber 16a as a numerical value.

And, the step of calculating the bending rate Af of the fiber 16a comprises step of: establishing the triangle to have lateral sides constituted by lines Fn+2Fn+1 and Fn+2Fn+m that connect the node Fn+2 to adjacent/nonadjacent nodes Fn+1 and Fn+m, respectively, and a base constituted by a line Fn+1Fn+m connecting adjacent nodes Fn+1 and Fn+m, calculating length hm of a perpendicular directed toward the base from the node Fn+2 or an arbitrary point in the vicinity thereof, calculating an aspect ratio Asm by dividing the calculated length hm of the perpendicular by the total value of the lengths of lateral sides Fn+2Fn+1 and Fn+2Fn+m, and calculating the bending rate Af of the fiber based on the calculated aspect ratios Asm and the aspect ratios As1 and As2 calculated with respect to the node Fn and the node Fn+1 (S400 to S408, S600 to S608). With this, in addition to the effects and advantages mentioned above, it becomes possible to easily and more accurately calculate the bending rate Af of the fiber 16a as a numerical value.

And, the step of calculating the bending rate Af of the fiber 16a comprises steps of: establishing the triangle to have lateral sides constituted by lines PFn−1 and PFn+2 connecting an arbitrary point P on one or another of lines FnFn−1 and FnFn+1 that connect the node Fn with adjacent nodes Fn−1 and Fn+1, respectively, with adjacent nodes Fn−1 and Fn+2 and a base constituted by line Fn−1Fn+2 that connects nodes Fn−1 and Fn+2 (S700), calculating length h1 of a perpendicular directed toward the base from arbitrary point P (S702), calculating aspect ratio As1 by dividing the calculated length h1 of the perpendicular by the total value of the lengths of the lateral sides PFn−1 and PFn+2 (S704), calculating the aspect ratios Asn with respect to other nodes (S706), and calculating bending rate Af of the fiber based on the calculated aspect ratios As1 and Asn (S708). With this, in addition to the effects and advantages mentioned above, it becomes possible to easily and more accurately calculate the bending rate Af of the fiber 16a as a numerical value.

And, the step of calculating the bending rate Af of the fiber 16a comprises a step of: calculating the bending rate Af of the fiber based on an average value of the calculated values (aspect ratios As1, As2; As1, As2, Asm; As1, Asm) (S408). With this, in addition to the effects and advantages mentioned above, it becomes possible to easily and more accurately calculate the bending rate Af of the fiber 16a as a numerical value.

And, the step of calculating the bending rate Af of the fiber 16a comprises a step of: calculating the bending rate Af of the fiber based on a maximum value among the calculated values (aspect ratios As1, As2; As1, As2, Asm; As1, Asm) (S608). With this, in addition to the effects and advantages mentioned above, it becomes possible to easily and more accurately calculate the bending rate Af of the fiber 16a as a numerical value.

And, the step of calculating the bending rate Af of the fiber 16a comprises a step of: calculating the bending rate Af of the fiber 16a based on the fiber 16a coordinate positions (x, y, z) in the three-dimensional space of the cavity 14c of the mold 14 (S100). With this, it becomes possible to more easily calculate the bending rate Af of the fiber 16a as a numerical value.

And, the step of evaluating the bending of the fiber 16a comprises a step of: evaluating the bending of the fiber by comparing the calculated bending rate Af with respect the evaluated length of the fiber with a predetermined threshold value (S102, S500 to S504). With this, it becomes possible to evaluate bending of the fiber 16a more quantitatively based on the bending rate Af of the fiber 16a as a numerical value calculated easily.

And, the evaluated length is a length from initial point to terminal point of the three-dimensional figure. With this, in addition to the effects and advantages mentioned above, it becomes possible to more accurately calculate the bending rate Af of the fiber 16a as a numerical value.

And, the step of evaluating the bending of the fiber 16a comprises a step of: evaluating the bending of the fiber 16a by associating the bending rate Af calculated with respect to evaluated length with a display color (S800). With this, it becomes possible to easily grasp the condition of bending in the molding by making the bending of the fiber 16a recognizable in a space.

And, the fiber 16a comprises at least one fiber. With this, it becomes possible to more easily calculate the bending rate Af of the fiber 16a as a numerical value.

The fourth embodiment and its modifications of this invention are configured to have a computer-aided resin behavior analyzer 10 that analyze bending behavior of multiple continuous fibers and long discontinuous fibers 16a incorporated in a resin 16 during molding in a mold 14 under predetermined molding conditions through a simulation program 20 installed on a computer 12, wherein the simulation program 20 comprises the steps of: selecting a fiber group of at least some among the multiple fibers 16a when the analysis conditions including at least multiple nodes F of the multiple fibers 16a are inputted (S900), calculating bending rates Af of individual fibers 16a constituting the selected fiber group based on the inputted analysis conditions (S902), evaluating bending of individual fibers 16a based on the bending rates Af calculated for the individual fibers 16a (S904), and evaluating strength or elastic modulus (stiffness) of the selected fiber group based on the bending evaluation results of the individual fibers 16a obtained (S43). With this, in addition to the effects and advantages mentioned above, it becomes possible to predict fiber bending-induced molding structural strength degradation or elastic modulus (stiffness) degradation by evaluating bending of individual fibers 16a based on the bending rates Af calculated for the individual fibers 16a and by evaluating strength or elastic modulus of the selected fiber group based on the bending evaluation results.

And, the simulation program 20 includes a step of: evaluating overall strength or elastic modulus of the multiple fibers 16a based on the fiber group strength or elastic modulus (stiffness) evaluation results obtained (S43). With this, in addition to the effects and advantages mentioned above, it becomes possible to evaluate overall strength or elastic modulus of the multiple fibers 16a, i.e., molding structural strength or elastic modulus (stiffness) during molding the resin 16 incorporating multiple fibers 16a in the mold 14, whereby enabling to predict fiber bending-induced molding structural strength degradation or elastic modulus degradation.

And, the step of evaluating bending of individual fibers 16a comprises a step of: comparing the calculated bending rates Af of the individual fibers 16a with predetermined threshold values (TH1, TH2, . . . ) and evaluates by classifying the fibers 16a into respective predetermined ranges (TH1 to TH2, TH2 to TH3, . . . ) (S1000 to S1006), and the step of evaluating strength or elastic modulus (stiffness) of the selected fiber group comprises steps of: calculating percentage of fibers 16a (fiber percentage) R falling in the predetermined ranges (S1100), and calculating strength or elastic modulus (stiffness) evaluated value of the selected fiber group based on the calculated percentage of the fibers 16a (fiber percentage) R (S1102). With this, in addition to the effects and advantages mentioned above, it becomes possible to evaluate molding structural strength or elastic modulus (stiffness) quantitatively based on the fiber percentage R of a specific bending rate Af that attribute to degradation of the structural strength or elastic modulus (equal to or higher than TH1), whereby enabling to predict fiber bending-induced molding structural strength degradation or elastic modulus degradation.

And, the step of evaluating the strength or elastic modulus (stiffness) of the selected fiber group comprises a step of: evaluating by displaying the percentage of fibers 16a (fiber percentage) R falling in the predetermined ranges (TH1 to TH2, TH2 to TH3, . . . ) separately for each predetermined range (S1102, FIG. 31). With this, in addition to the effects and advantages mentioned above, it becomes possible to evaluate molding structural strength or elastic modulus (stiffness) by numerals, whereby making it easy to compare results when molding conditions are changed.

And, the step of evaluating the strength or elastic modulus (stiffness) of the selected fiber group comprises a step of: evaluating by calculating the strength or elastic modulus of the selected fiber group based on characteristics (strength or elastic modulus (stiffness) calculation map) established beforehand from the calculated fiber group strength or elastic modulus evaluated value (total of the fiber percentages R of all ranges equal to or higher than TH1) (S1104 to S1110). With this, in addition to the effects and advantages mentioned above, it becomes possible to accurately calculate molding structural strength or elastic modulus (stiffness), whereby enabling to ascertain whether the strength or modulus is sufficient by comparing with required strength or modulus.

And, the step of evaluating bending of the fibers 16a comprises the steps of: selecting a fiber group of at least some among the multiple fibers 16a when the analysis conditions including at least multiple nodes F of the multiple fibers 16a are inputted (S1200), calculating bending rates Af of individual fibers 16a constituting the selected fiber group based on the inputted analysis conditions (S1202), evaluating bending of the individual fibers 16a by associating the calculated bending rates Af of the individual fibers 16a with display colors (S1204, FIGS. 35, 36), and evaluating strength or elastic modulus (stiffness) of the selected fiber group based on the bending evaluation results of the individual fibers 16a obtained (S43). With this, in addition to the effects and advantages mentioned above, it becomes possible to evaluate strength or elastic modulus with display colors, thereby enabling to easily compare and evaluate results of molding conditions when changed and to predict fiber bending-induced molding structural strength degradation or elastic modulus (stiffness) degradation.

And the simulation program 20 includes a step of: evaluating overall strength or elastic modulus of the multiple fibers 16a based on the fiber group strength or elastic modulus evaluation results obtained (S43). With this, in addition to the effects and advantages mentioned above, it becomes possible to evaluate strength or elastic modulus quantitatively, thereby enabling to predict fiber bending-induced molding structural strength degradation or elastic modulus (stiffness) degradation.

And, the simulation program 20 includes steps of: selecting a fiber group of at least some among the multiple fibers 16a when data including at least multiple nodes F of the multiple fibers 16a obtained by means of an analytical instrument is inputted (S900), calculating bending rates Af of individual fibers 16a constituting the selected fiber group based on the input data (S902), evaluating bending of individual fibers 16a based on the calculated bending rate Af of the individual fibers 16a (S904), and evaluating strength or elastic modulus of the selected fiber group based on the bending evaluation results of the individual fibers 16a obtained (S43). With this, in addition to the effects and advantages mentioned above, it becomes possible to analyze and compare data obtained by analyzing an actual molding with an analytical instrument such as X-ray CT scanner (shapes, nodes of fibers in the actual molding) in a similar manner as simulation data.

In this embodiment and its modifications, the evaluated length is defined as a definite value (e.g., 4 mm) but it can be defined as an indefinite value (e.g., 4 mm, 6 mm, . . . 20 mm) instead.

Moreover, the number of fiber 16a segments need not be limited to 10 and it is of course possible for the segment length to be irregular. Moreover, although calculation of aspect ratios Asn for all or some nodes starting from one end (initial end) to the other end (terminal end) of the fiber 16a is exemplified, it is possible instead to start from an intermediate part of the fiber 16a and also possible to calculate for only some of the nodes. Further, although calculation of aspect ratios using three or four nodes is exemplified, this is not a limitation. In addition, the number of fibers 16a should not be limited to one but can be two or more.

It should be noted in the above that the configuration or structure of the apparatus are not limited to those disclosed.

While the present invention has been described with reference to the preferred embodiments thereof, it will be understood, by those skilled in the art, that various changes and modifications may be made thereto without departing from the scope of the appended claims.

What is claimed is:

1. A computer-aided resin behavior analyzer that analyzes bending behavior of a continuous fiber and long discontinuous fiber incorporated in a resin, the computer-aided resin behavior analyzer equipped with:
   a computer having a CPU, a memory, and an input device; and
   a mold having an upper mold half, a lower mold half, and a cavity formed between the upper mold half and the lower mold half that accommodates the resin;
   wherein the computer-aided resin behavior analyzer is configured to analyze the bending behavior of the fiber during molding in the mold under predetermined molding conditions through a simulation program installed in the memory of the computer, wherein the simulation program comprises the steps of:
   calculating, when analysis conditions including at least multiple nodes F of the fiber is inputted, a bending rate Af of the fiber with respect to an evaluated length obtained from at least one node Fn among multiple nodes F anticipated under the molding conditions based on the inputted analysis conditions, and
   evaluating bending of the fiber based on the calculated bending rate Af with respect to the evaluated length.

2. A computer-aided resin behavior analyzer according to claim 1, wherein the step of calculating the bending rate Af of the fiber comprises the step of:
   calculating the bending rate Af of the fiber based on a three-dimensional figure generated by connecting at least one node Fn among the multiple nodes F with a curved line or straight line.

3. A computer-aided resin behavior analyzer according to claim 1, wherein the step of calculating the bending rate Af of the fiber comprises the step of:
   calculating the bending rate Af of the fiber based on a second three-dimensional figure generated by connecting, with curved lines or straight lines, points on a three-dimensional figure generated by connecting at least one node Fn among the multiple nodes F with a curved line or straight line.

4. A computer-aided resin behavior analyzer according to claim 3, wherein the second three-dimensional figure comprises a triangle.

5. A computer-aided resin behavior analyzer according to claim 4, wherein the step of calculating the bending rate Af of the fiber comprises the steps of:
   establishing the triangle to have lateral sides constituted by lines FnFn−1 and FnFn+1 that connect the node Fn with adjacent nodes Fn−1 and Fn+1, respectively, and a base constituted by a line Fn−1Fn+1 that connects the adjacent nodes Fn−1 and Fn+1,
   calculating length h1 of a perpendicular directed toward the base from the node Fn or an arbitrary point in the vicinity thereof,
   calculating an aspect ratio As1 by dividing the calculated length h1 of the perpendicular by the total value of the lengths of the lateral sides FnFn−1 and FnFn+1, and
   calculating the bending rate Af of the fiber based on the calculated aspect ratio As1.

6. A computer-aided resin behavior analyzer according to claim 5, wherein the step of calculating the bending rate Af of the fiber comprises the steps of:
   establishing the triangle to have lateral sides constituted by lines Fn+1Fn and Fn+1Fn+2 that connect the node Fn+1 with adjacent nodes Fn and Fn+2, respectively, and a base constituted by a line FnFn+2 that connects the adjacent nodes Fn and Fn+2,
   calculating length h2 of a perpendicular directed toward the base from the node Fn+1 or an arbitrary point in the vicinity thereof,
   calculating an aspect ratio As2 by dividing the calculated length h2 of the perpendicular by the total value of the lengths of the lateral sides Fn+1Fn and Fn+1Fn+2, and
   calculating the bending rate Af of the fiber based on the calculated aspect ratio As2 and the aspect ratio As1 calculated with respect to the node Fn.

7. A computer-aided resin behavior analyzer according to claim 6, wherein the step of calculating the bending rate Af of the fiber comprises the steps of:
   establishing the triangle to have lateral sides constituted by lines Fn+2Fn+1 and Fn+2Fn+m that connect the node Fn+2 to adjacent/nonadjacent nodes Fn+1 and Fn+m, respectively, and a base constituted by a line Fn+1Fn+m connecting the adjacent/nonadjacent nodes Fn+1 and Fn+m,
   calculating length hm of a perpendicular directed toward the base from the node Fn+2 or an arbitrary point in the vicinity thereof,
   calculating an aspect ratio Asm by dividing the calculated length hm of the perpendicular by the total value of the lengths of lateral sides Fn+2Fn+1 and Fn+2Fn+m, and
   calculating the bending rate Af of the fiber based on the calculated aspect ratios Asm and the aspect ratios As1 and As2 calculated with respect to the node Fn and the node Fn+1.

8. A computer-aided resin behavior analyzer according to claim 4, wherein the step of calculating the bending rate Af of the fiber comprises the steps of:
   establishing the triangle to have lateral sides constituted by lines PFn−1 and PFn+2 connecting an arbitrary point P on one or another of lines FnFn−1 and FnFn+1 that connect the node Fn with adjacent nodes Fn−1 and Fn+1, respectively, with adjacent nodes Fn−1 and Fn+2 and a base constituted by line Fn−1Fn+2 that connects the nodes Fn−1 and Fn+2,
   calculating length h1 of a perpendicular directed toward the base from the arbitrary point P,
   calculating aspect ratio As1 by dividing the calculated length h1 of the perpendicular by the total value of the lengths of the lateral sides PFn−1 and PFn+2,
   calculating the aspect ratios Asn with respect to other nodes, and
   calculating bending rate Af of the fiber based on the calculated aspect ratios As1 and Asn.

9. A computer-aided resin behavior analyzer according to claim 6, wherein the step of calculating the bending rate Af of the fiber comprises the step of:
   calculating the bending rate Af of the fiber based on an average value of the calculated values.

10. A computer-aided resin behavior analyzer according to claim 6, wherein the step of calculating the bending rate Af of the fiber comprises the step of:
    calculating the bending rate Af of the fiber based on a maximum value among the calculated values.

11. A computer-aided resin behavior analyzer according to claim 1, wherein the step of calculating the bending rate Af of the fiber comprises the step of:
    calculating the bending rate Af of the fiber based on fiber coordinate positions in a three-dimensional space of the cavity of the mold.

12. A computer-aided resin behavior analyzer according to claim 1, wherein the step of evaluating the bending of the fiber comprises the step of:
evaluating the bending of the fiber by comparing the calculated bending rate Af with respect the evaluated length of the fiber with a predetermined threshold value.

13. A computer-aided resin behavior analyzer according to claim 2, wherein the evaluated length is a length from an initial point to a terminal point of the three-dimensional figure.

14. A computer-aided resin behavior analyzer according to claim 1, wherein the step of evaluating the bending of the fiber comprises the step of:
evaluating the bending of the fiber by associating the bending rate Af calculated with respect to the evaluated length with a display color.

15. A computer-aided resin behavior analyzer according to claim 1, wherein the fiber comprises at least one fiber.

16. A computer-aided resin behavior analyzer according to claim 1, wherein the simulation program comprises the steps of:
selecting a fiber group of at least some among multiple fibers when the analysis conditions including at least multiple nodes F of the multiple fibers are inputted through the input device,
calculating bending rates Af of individual fibers constituting the selected fiber group based on the inputted analysis conditions,
evaluating bending of individual fibers based on the bending rates Af calculated for the individual fibers, and
evaluating strength or elastic modulus of the selected fiber group based on the bending evaluation results of the individual fibers obtained.

17. A computer-aided resin behavior analyzer according to claim 16, wherein the simulation program includes the step of:
evaluating overall strength or elastic modulus of the multiple fibers based on the fiber group strength or elastic modulus evaluation results obtained.

18. A computer-aided resin behavior analyzer according to claim 16, wherein the step of evaluating bending of individual fibers comprises the step of:
comparing the calculated bending rates Af of the individual fibers with predetermined threshold values and evaluating by classifying the fibers into respective predetermined ranges, and
the step of evaluating strength or elastic modulus of the selected fiber group comprises the steps of:
calculating percentage of fibers falling in the predetermined ranges, and
calculating strength or elastic modulus evaluated value of the selected fiber group based on the calculated percentage of the fibers.

19. A computer-aided resin behavior analyzer according to claim 18, wherein the step of evaluating the strength or elastic modulus of the selected fiber group comprises the step of:
evaluating by displaying the percentage of fibers falling in the predetermined ranges separately for each predetermined range.

20. A computer-aided resin behavior analyzer according to claim 16, wherein the step of evaluating the strength or elastic modulus of the selected fiber group comprises the step of:
evaluating by calculating the strength or elastic modulus of the selected fiber group based on characteristics established beforehand from the calculated fiber group strength or elastic modulus evaluated value.

21. A computer-aided resin behavior analyzer according to claim 16, wherein the step of evaluating bending of the fibers comprises the step of:
evaluating bending of the individual fibers by associating the calculated bending rates Af of the individual fibers with display colors.

22. A computer-aided resin behavior analyzer according to claim 21, wherein the simulation program includes the step of:
evaluating overall strength or elastic modulus of the multiple fibers based on the fiber group strength or elastic modulus evaluation results obtained.

23. A computer-aided resin behavior analyzer according to claim 1, wherein the simulation program includes the steps of:
selecting a fiber group of at least some among multiple fibers when data including at least multiple nodes F of the multiple fibers obtained by means of an analytical instrument is inputted through the input device,
calculating bending rate Af of individual fibers constituting the selected fiber group based on the input data,
evaluating bending of individual fibers based on the calculated bending rate Af of the individual fibers, and
evaluating strength or elastic modulus of the selected fiber group based on the bending evaluation results of the individual fibers obtained.

* * * * *